United States Patent [19]

Leventis et al.

[11] Patent Number: 5,189,549
[45] Date of Patent: Feb. 23, 1993

[54] ELECTROCHROMIC, ELECTROLUMINESCENT AND ELECTROCHEMILUMINESCENT DISPLAYS

[75] Inventors: Nicholas Leventis, Somerville; Mark S. Wrighton, Winchester, both of Mass.

[73] Assignee: Molecular Displays, Inc., Andover, Mass.

[21] Appl. No.: 485,379

[22] Filed: Feb. 26, 1990

[51] Int. Cl.⁵ .............................................. G02F 1/153
[52] U.S. Cl. ..................................... 359/271; 359/268
[58] Field of Search .................. 350/357; 359/271, 268

[56] References Cited

U.S. PATENT DOCUMENTS

| | | | |
|---|---|---|---|
| 4,473,695 | 9/1984 | Wrighton et al. | 350/357 |
| 4,717,673 | 1/1988 | Wrighton et al. | 422/60 |
| 4,721,601 | 1/1988 | Wrighton et al. | 350/357 |

OTHER PUBLICATIONS

Schmid, R. Huesmann, P. L., Johnson, W. S., Thermodynamically Uphill Reduction of a Surface-Confined N,N'-Dialkyl-4,4'-bipyridinium Derivative on Illuminated p-Type Silcon Surfaces, pp. 5123-5125, 1980.
Beni, G. and Shay, L., Ion-Insertion Electrochromic Displays, pp. 83-136, undated.
Randin, J. P., Electrochormic displays prepare to hoist their colors, pp. 89-91, Dec. 29, 1981.
Sutela, T., Thin film electroluminescent displays produced by atomic layers, pp. 73-78, Apr. 1984.
Charge Transfer Devices, pp. 111-1124, 1987.
Penton, H. R., Polyphosphazenes: Performance Polymers for Specialty Applications, pp. 277-281, 1988.

Primary Examiner—Rolf Hille
Assistant Examiner—Robert Limanek
Attorney, Agent, or Firm—Curtis Morris & Safford

[57] ABSTRACT

A display having an array of matrix addressable pairs of electrodes mounted face up on the same substrate. The pairs of electrodes are derivatized with either electrochromic materials or electroluminescent material to form the pixels of the display. In the electrochromic embodiment of the invention, a layer of a solid polymer electrolyte is included. The air of electrodes may also be left clean of derivatizing material, but with an electroluminescent substance dissolved in the solid polymer electrolyte. An electrochemiluminescent embodiment is also provided where the electrochemiluminescent substance can be dissolved in the solid polymer electrolyte. A method of patterning the electrolyte layer to form relatively non-conductive borders around each of the pairs by selective exposure of the electrolyte layer in the region of the border to electromagnetic radiation to cause permanent change in the chemical composition of the electrolyte so that the exposed border regions are rendered relatively non-conductive is also provided. An electrically reconfigurable photomask having an area comprised of an arrangement of electrochromic covered electrode pairs constituting pixels, the opacity and transmissivity of which may be controlled by application of an electrical bias to yield complete control over the transmissivity and opacity of each pixel of the areas, is also provided.

63 Claims, 19 Drawing Sheets

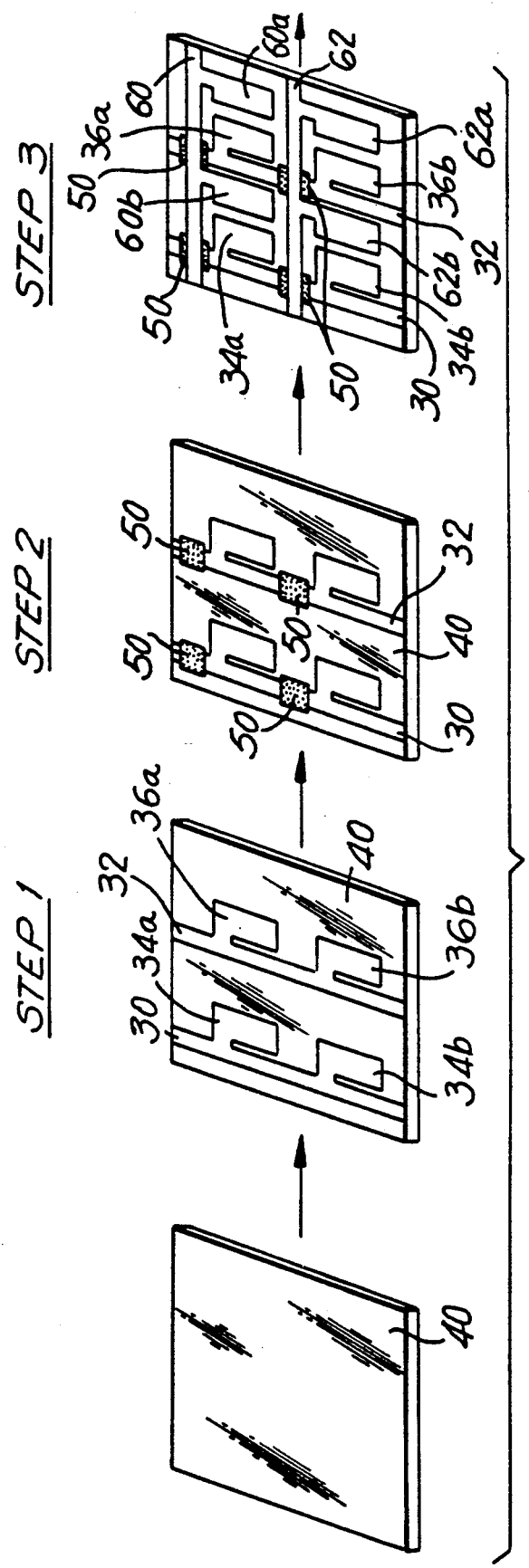

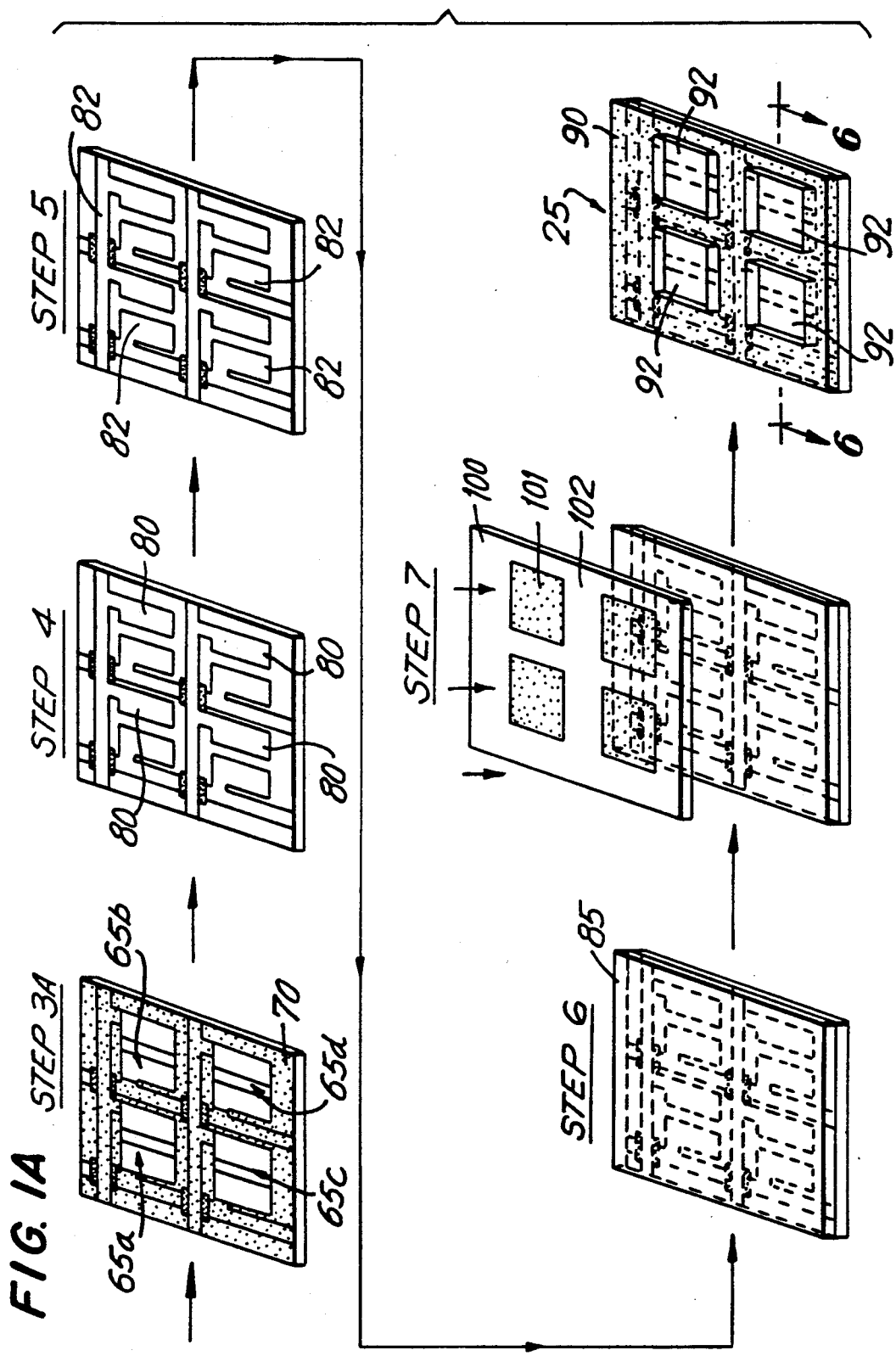

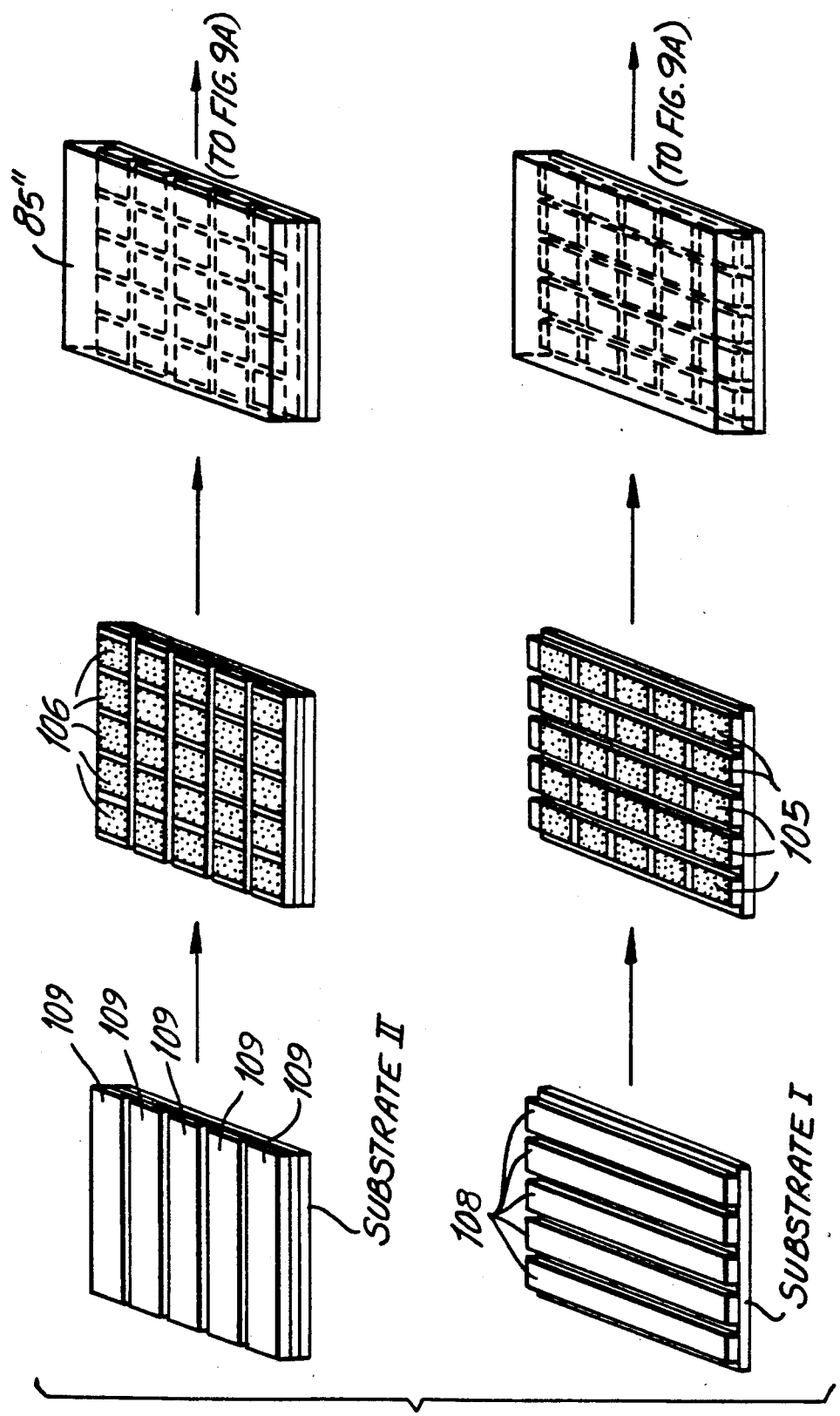

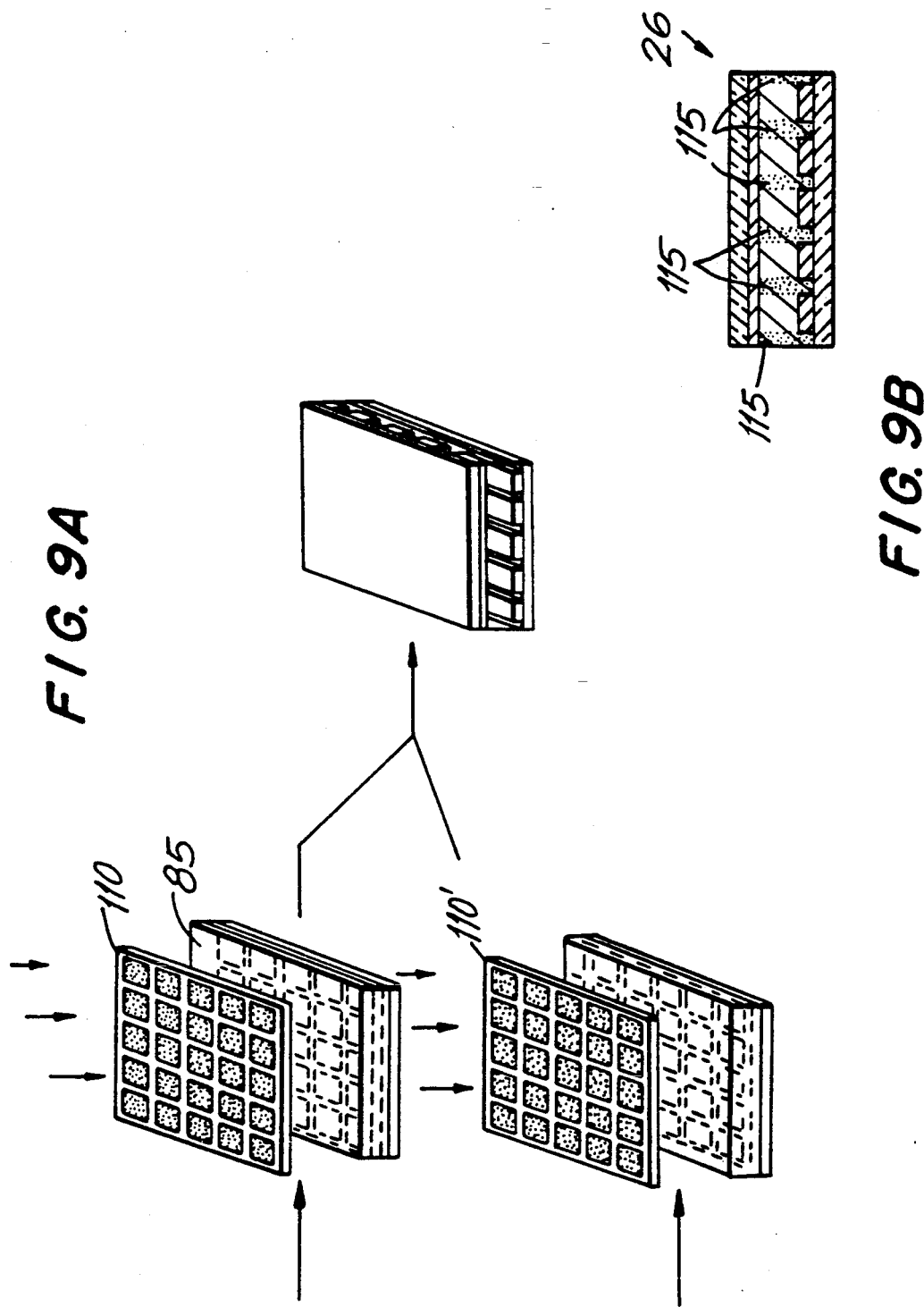

STEP 1

STEP 2

LAYER A OF FIRST PAIR 113
LAYER A' OF SECOND PAIR 114
LAYER B' OF SECOND PAIR 114
LAYER B OF FIRST PAIR 113

TRANSPARENT

STEP 3

LAYER A OF FIRST PAIR 113

LAYER A' OF SECOND PAIR 114

LAYER B OF SECOND PAIR 114

LAYER B OF FIRST PAIR 113

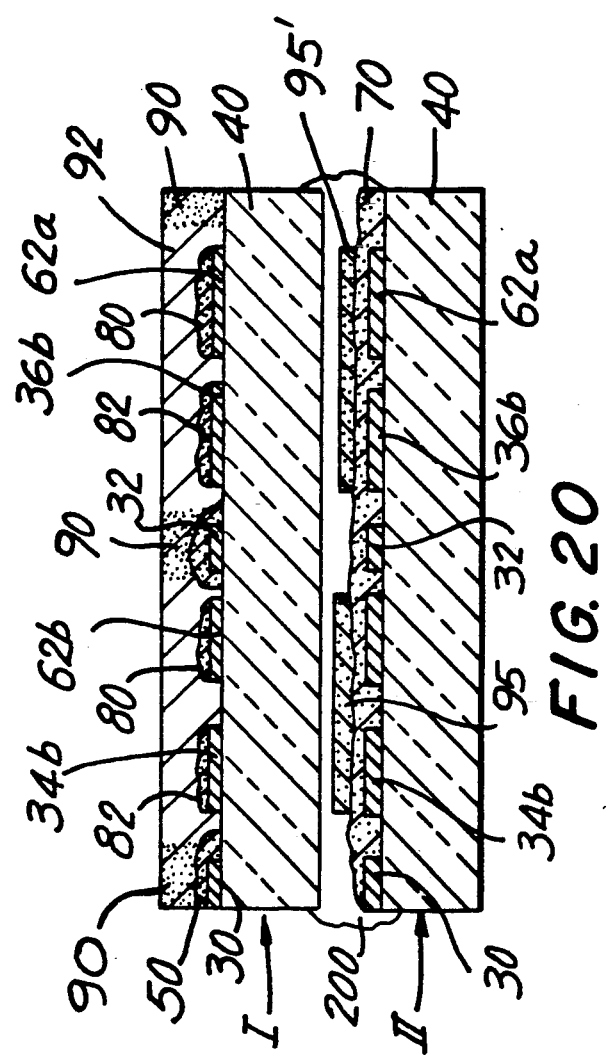

ELECTROCHROMIC, ELECTROLUMINESCENT AND ELECTROCHEMILUMINESCENT DISPLAYS

FIELD OF THE INVENTION

The present invention relates to electrically reconfigurable displays and particularly to electrochromic, electroluminescent and electrochemiluminescent displays.

PRIOR ART

Various general flat arrays of picture elements (pixels) for the display of information are known. Such flat panel displays fall into two major categories: a) emissive and b) non-emissive display systems. The emissive display systems are based on the generation of light, while the non-emissive display systems are based on the modulation of the ambient light.

One example in common use in the non-emissive category is the liquid crystal display, wherein the property of certain materials to align themselves with an electric field is used to create a display. Although liquid crystals are widely used, they have the disadvantage of having a limited viewing angle, relatively low contrast and limited resolution. Furthermore, electrical addressing of liquid crystal arrays for high resolution applications generally requires an active display, that is, a display array having a thin-film transistor associated with each picture element. This requirement tends to increase the manufacturing cost and complexity of liquid crystal arrays, and to limit the minimum practical size of each picture element of such arrays. Furthermore, the need for precise control over the thickness of the space which is occupied by the liquid crystaline material between the front and the rear electrodes puts a limit on the maximum size of each picture elements. These limitations have rendered liquid crystal displays generally impractical for very high resolution applications, as well as for large outdoor information displays.

Some efforts have been made to make non-emissive displays using electrochromic materials. It is known that certain substances reversibly change their electromagnetic radiation absorption characteristics (i.e. color) when their redox state is changed, a property generally referred to as electrochromism. One well-known example is tungsten trioxide ($WO_3$), which reversibly changes from pale yellow to deep blue when it is reduced.

Efforts have been made to utilize the reversible electrochromic property to make matrix addressable flat screen displays, however, such efforts have generally not met with practical success due to a number of problems. One such problem is that matrix addressing of such electrochromic arrays tends to cause undesired coloration of nearby electrochromic elements, an effect commonly referred to as cross-talk, and efforts to deal with the cross-talk problem have not been entirely successful. In U.S. Pat. No. 4,129,861, for example, use of diode elements to increase the threshold voltage of such electrochromic element was proposed. However, in order to use matrix addressing in such an arrangement, each electrochromic element must be provided with its own diode, which increases the cost and complexity of the display.

In other efforts to eliminate cross-talk, transistor switches have been embedded together with each picture element of electrochromic matrices, in a fashion similar to active matrices used for the addressing of liquid crystal matrix displays. European patent application No. 82094111.7, for instance, describes the operation of such a display. This, however, also tends to increase cost and complexity.

In U.S. Pat. No. 4,488,781, an electrochromic display matrix is proposed wherein electrochromic material is deposited on spaced apart parallel strips of transparent conductive material. These strips criss-cross with spaced apart transparent conductive strips each of which is covered with an ion-conductive material, with the side of the strips having the electrochromic material facing the ion-conductive material side of the criss-crossed strips. A non-conductive paint is included between ion-conductive material covering the strips. Although this arrangement is said to substantially eliminate cross-talk, in fact alternate ionically supported current paths still exist longitudinally along each of the ion-conductive material covered strips such that cross-talk is not completely eliminated. Furthermore, the arrangement of electrochromic elements sandwiched between conductive strips requires the use of transparent conductive material, such as tin oxide ($SnO_2$), which has considerably lower conductivity than opaque metallic conductors, such as gold. Still further, the resolution obtainable with this proposed construction has been limited to strips in the range of 0.017 inches with a separation distance in the range of 0.003 inches, which does not significantly improve over the resolution currently available with liquid crystal technology.

Emissive displays include cathode ray tubes, semiconductor based light emitting diode arrays, electroluminescent arrays and electrochemiluminescent arrays. Conventional electroluminescent displays use the sandwich configuration with criss-crossed matrix addressed electrodes. Such an electroluminescent display is disclosed, for example in T. Sutela, *Displays*, April 1984, "Thin film electroluminescent displays produced by atomic layers", p. 73–78. However, this configuration requires the use of relatively low conductivity transparent electrodes for at least the top substrate. Because electroluminescent displays require considerable power, the relatively low conductivity of the transparent conductors is a significant limitation.

Electrochemiluminescent displays operate on the principal that certain substances have stable oxidized and reduced forms that can react with each other in an annihilation fashion to yield the neutral form of the substance and one photon of light. The electrochemiluminescent substance is mixed into an electrolyte, and a bias is cyclically applied to emersed electrodes to obtain the oxidized and reduced forms, which then diffuse toward one another to cause annihilation and light. Electrochemiluminescent displays in the conventional sandwich configuration suffer from the same low conductivity electrode limitation as electroluminescent displays. In addition, electrochemiluminescent displays suffer from the difficulty of eliminating cross-talk between the pixels in matrix addressed displays due to the presence of the electrolyte, as in prior art electrochromic displays.

The manufacture of integrated circuits by conventional photolithographic techniques involves the making of a group of several patterns, one for each photolithographic step. During manufacture of the integrated circuit, the substrate covered with a photoresist is exposed with light shone through one of these patterns. Then, after subsequent manufacturing steps, the substrate is exposed through another of the patterns. The making of and setting up of these patterns is time consuming and expensive.

OBJECTS OF THE INVENTION

Accordingly, it is an object of the invention to provide a matrix addressable display that overcomes the foregoing problems and limitations.

In particular, it is an object of the present invention to provide an electrochromic display and an electrochemiluminescent display that substantially eliminates the cross-talk between display elements (i.e. pixels) by making each pixel a substantially completely isolated electrochemical cell.

It is a further object of the invention to provide a display having a matrix of electrode pairs which can be made at any size, and in particular which can be microfabricated with very small minimum features for very high resolution applications.

It is a further object of the present invention to provide a display having a matrix of electrode pairs which can utilize opaque conductive bus bars and electrodes in a configuration which can be fabricated into a single substrate.

It is a still further object of the invention to provide a display wherein the first electrode of the pair is derivatized with an electrochromic material and the second electrode is derivatized with a material electrochemically complementary to the electrochromic material to minimize the tendency for decomposition reaction of either the second electrode itself or the electrolyte.

It is a yet further object of the invention to provide a display wherein the first electrode is derivatized with a first electrochromic material and the second electrode is derivatized with electrochromic material electrochromically complementary to the first electrochromic material, in the sense that one electrochromic material changes to a colored state when oxidized and the other to a colored state when reduced.

It is a further object of the invention to provide a method of fabrication of a matrix of electrochemical cells wherein the electrolyte layer can be patterned to create isolated electrochemical cells by selective exposure of the electrolyte to electromagnetic radiation to render the exposed regions relatively ionically non-conductive.

It is a further object to provide a method for microfabricating a display with very small feature dimensions for very high resolution applications.

It is a still further object of the invention to provide an electroluminescent display wherein all electrodes are mounted face up on the same substrate in side by side orientation.

It is another object of the invention to provide an electrochemiluminescent display wherein all electrodes are mounted face up on the same substrate in side by side orientation.

It is a still further object of the invention to provide an electrochemiluminescent display having a photopatterned electrolyte to substantially eliminate cross-talk between the pixels of the display.

It is a yet further object of the invention to provide an electrically reconfigurable projection device.

It is a yet further object of the invention to provide a method and apparatus for photolithographic fabrication of integrated circuits using an electrically reconfigurable photomask.

SUMMARY OF THE INVENTION

In accordance with a preferred embodiment of the present invention, a non-emissive display pixel is provided comprising a substrate and a pair of electrodes mounted face up and side by side on one side of the substrate and in close proximity to each other. At least one of the electrodes is coated on its face with a first chemical substance which is electrochromic, and a layer of ionically conductive electrolyte is included over the electrode pair to complete an electrochemical cell so that when a bias is imposed between the electrodes of the pair, the first chemical substance changes its spectral absorption characteristics.

In accordance with another embodiment of the present invention, an electroluminescent display pixel is provided comprising a substrate and a pair of electrodes mounted face up and side by side on one side of the substrate and in close proximity to each other. An electroluminescent chemical substance is provided over each electrode so that when a bias is imposed between the electrodes of the pair, the electroluminescent chemical substance emits light.

In accordance with another embodiment of the present invention, an electrochemiluminescent display pixel is provided comprising a substrate and a pair of electrodes mounted face up and side by side on one side of the substrate and in close proximity to each other. An electrolyte layer is provided over the pair of electrodes, the electrolyte including an electrochemiluminescent chemical substance so that when a bias is imposed between the electrodes of said pair, the electrochemiluminescent chemical substance emits light.

The present invention also provides in one of its preferred embodiments a display comprising an array of matrix addressable pairs of electrodes. The display comprises a substrate, a plurality of substantially parallel and spaced apart electronically conductive means defining columns of bus bars mounted on one side of the substrate, each of the column bus bars being electrically separate from the other column bus bars so that each is independently addressable by electrical biasing means, and a plurality of column electrode means mounted face up on the one side of the substrate and spaced at intervals along each of the column bus bars. The array also includes a plurality of substantially parallel and spaced apart electronically conductive means defining row bus bars on the one side of the substrate, the row bus bars crossing but being electrically insulated from the column bus bars. Each of the row bus bars is electrically separate from the other row bus bars so that each of the row bus bars is independently addressable by electrical biasing means. A plurality of row electrode means are mounted face up on the one side of the substrate and spaced at intervals along each row bus bar, each of said row electrodes being positioned to have a column electrode in close proximity to and side by side therewith to define one of the electrode pairs.

In accordance with another embodiment of the present invention, a display comprising an array of matrix addressable pixels is provided. The display includes a first substrate, a plurality of substantially parallel and spaced apart electronically conductive means defining columns of bus bars mounted on the first substrate, each of the column bus bars being independently addressable by electrical biasing means and having a plurality of column electrode means face up and at spaced intervals along the length of the column. The display also includes a second substrate in opposed and facing relationship to the first substrate but spaced apart therefrom, a plurality of substantially parallel and spaced apart electronically conductive means defining rows of bus bars mounted face up on said second substrate. Each of the row bus bars is independently addressable by electrical biasing means and has a plurality of row electrode means at spaced intervals along its length so that each row electrode is in opposed and facing relationship to a corresponding column electrode means but spaced apart therefrom to define a display pixel. A layer of electrolyte is sandwiched between the first and second electrodes, the electrolyte being separated into individual zones defined by relatively non-conducting borders around each electrode pair so that each electrode pair constitutes a substantially separate electrochemical cell defining a pixel.

In accordance with another embodiment of the present invention, a method of patterning the ion-conductive regions of an electrolyte to form a plurality of ion-conductive electrolyte zones separated from each other by relatively non-conductive border regions is provided, the method comprising the steps of spreading out an electrolyte, selectively exposing the border regions of the electrolyte to electromagnetic radiation of adequate energy to cause permanent change of the chemical composition of said electrolyte so that said exposed border regions are rendered relatively non-conductive.

In another embodiment of the present invention, a method of fabrication of an integrated circuit is provided comprising the steps of coating a substrate to be fabricated into an integrated circuit with a photoresist, electrically imposing a desired first pattern of transparent and non-transparent regions upon an electrically reconfigurable photomask, exposing the substrate through the electrically reconfigurable photomask, electrically imposing a desired second pattern of transparent and non-transparent regions upon the electrically reconfigurable photomask, and exposing the substrate through the electrically reconfigurable photomask.

In still another embodiment of the present invention, an electrically reconfigurable photomask is provided. The photomask has an area comprised of pixels, the opacity and transmissivity of which may be controlled by application of an electrical bias. The area is comprised of a laminated plurality of overlying planar arrangements of pairs of electrodes. At least one of the electrodes of each of the pairs of each planar arrangement is coated with an electrochromic material. The pairs of electrodes of the respective overlying arrangements are substantially alternatingly arranged so that application of a bias between electrodes of selective pairs on a pair by pair basis, when taken in the aggregate, yields substantially complete control over the transmissivity and opacity of each pixel of the area of the photomask.

BRIEF DESCRIPTION OF THE DRAWINGS

These and other objects, features and advantages of the present invention will be apparent to those skilled in the art upon review of the following detailed description and drawings, wherein:

FIG. 1 depicts in step by step sequence a preferred method of fabrication of an array of pairs of electrodes in accordance with a preferred embodiment of the present invention;

FIG. 1A depicts in step by step sequence a preferred method of fabrication of an array of electrochromic material coated pixels using the array of pairs of electrodes in FIG. 1;

FIGS. 9 and 9A depicts in step by step sequence a preferred method of fabrication of a sandwich array having criss-crossed and opposing electrodes in accordance with a preferred embodiment of the present invention;

FIG. 9B depicts a cross-sectional view of the array constructed in accordance with FIGS. 9 and 9A, taken along the line 9B—9B of FIG. 9A.

FIG. 20 depicts a cross-sectional view of the arrays depicted in FIGS. 6 and 7 laminated together, with one pixel of each array "on" and one pixel "off".

DETAILED DESCRIPTION

Figure 2:
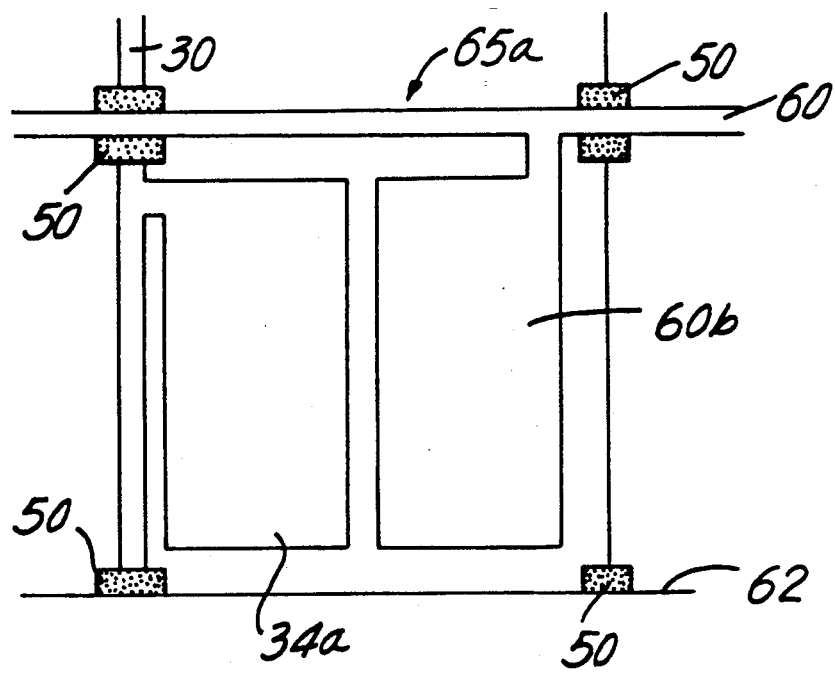
FIG. 2 is a plan view of a preferred embodiment of a pair of side by side disposed electrodes of one pixel of an array in accordance with a preferred embodiment of the present invention.

Referring now to the drawings in detail, and initially to FIG. 1 and FIG. 1A thereof, a step by step method of fabrication of a preferred array of pairs of electrodes derivatized with electrochromic material in accordance with an embodiment of the present invention, and the array so fabricated, are depicted. The steps include the following:

Step 1: Column bus bars 30 and 32 and the electrodes associated with them, 34a, 34b and 36a, 36b, respectively, are confined on (i.e. applied to) a substrate 40. The substrate 40 is preferably made of an electrical insulator such as glass. If a reflective display is desired, the electrodes are preferably made of a material such as gold, which has high conductivity, although it is opaque. If a transmissive display is desired, obviously the electrodes must be made of a transparent conductor, such as, for example, tin oxide ($SnO_2$). For ease of fabrication, the bus bars are conveniently made integrally with the associated electrodes and of the same material, although this is not essential. In fact, an opaque conductor such as gold can be used for the bus bars even on transmissive displays, provided that the area of the array occupied by the bus bars is relatively small compared to the area occupied by the electrode pairs themselves.

The method for the confinement of the column bus bars 30 and 32 and associated electrodes on the substrate depends upon the nature of the material they are made of. If they are metallic the deposition and confinement is preferably done by either deposition by evaporation or sputtering through a mask having openings (holes) in the shape of the desired pattern held between the substrate and the metal source; or photolithographically, i.e. spreading and patterning a photoresist so that the areas where no metal is desired are left covered with photoresist. With the photolithographic method, the metal of the electrodes (and bus bars, if the same material is used for both) is deposited by evaporation or sputtering over the whole substrate. Subsequently, liftoff, i.e. dissolution of the remaining photoresist in a solvent so that it takes with it the overlying metal, leaves on the substrate the desired pattern of the electrodes.

If the bus bars and the associated electrodes are made of a conducting and transparent oxide (like tin oxide or indium oxide), then one preferred method to make the pattern of the electrodes is to start with a substrate that already has a coating of the oxide on it. Then the areas where the pattern of the bus bars and the associated electrodes are to be located are protected with a photolithographically confined layer of photoresist. Finally, the unwanted conducting oxide can be dissolved from the unprotected areas with a dilute (1% v/v) hydrogen fluoride solution.

Step 2: Pads of insulating material 50 are deposited at points where the row bus bars of the matrix are to cross over the column bars that were deposited in step 1. The purpose of these pads is to prevent shorting of the column and row bus bars at the crossing points.

The method for the deposition of insulating pads 50 depends on the material used for the pads. The pads are preferably of an insulating polymer like polyimide. In this case they are preferably confined photolithographically in the following manner: First, uncross-linked polyimide is spin-coated over the substrate. Then a positive photoresist is spin-coated on top of the polyimide film. Then the photoresist is exposed/developed so that the areas that will define the insulating pads remain covered with photoresist. The unprotected polyimide is dissolved with a base like a dilute solution of sodium hydroxide. Uncross-linked polyimide is commercially available under the trade name PYRALIN ® (DuPont). Finally, after the polyimide has been dissolved from everywhere else except underneath the photoresist, the photoresist is removed with acetone leaving polyimide intact to define the pads. The polyimide pads then are cured at 400° C. for 15 minutes. At this stage, shorts between column and row bus bars at the crossing points caused by pinholes in the insulating layer at the crossing points from dust or other adventitious particles during deposition of these layers are removed by applying a substantially high voltage across all the rows and columns successively. Shorts then behave like fuses and "blow-up" and disappear, with no apparent change in the matrix appearance or function.

The pads can also be made of an insulating ceramic like silicon dioxide, or silicon nitride. In this case, the pads are preferably confined in place either by a deposition through the mask, or photolithographically. The mask method is the same as the one for the metallic electrode deposition described in step 1 above.

The photolithographic method involves first deposition of the insulating material over the whole surface of the substrate, then protection of the insulating ceramic at the areas where the pads are to be located underneath a layer of photolithographically confined photoresist, and finally removal of the unprotected insulator by exposing the sample to an etching environment. As an etching environment, a dilute solution (1% v/v) of hydrogen fluoride is sufficient to remove silicon dioxide, while a reactive plasma such as a plasma of sulfur hexafluoride or carbon tetrafluoride is necessary to etch silicon nitride. Eventually the protecting photoresist is removed either by a solvent like acetone, or by exposing the sample to an oxygen plasma.

Step 3: Row bus bars 60 and 62 and the associated electrodes 60a, 60b and 62a, 62b, respectively, are confined on the substrate so that they cross over the column bus bars at the places where the insulating pads are located, and in such a way that each column electrode has a row electrode associated with it. The two electrodes are close to each other but not in electrical contact. The methods to deposit the row bus bars and the associated electrodes are very similar to the methods described above for the deposition and confinement of the column bus bars and the associated electrodes. The only difference is that if the row bus bars or the associated electrodes are to be made of tin oxide, tin oxide has to be deposited/confined over the substrate by some sputtering/photolithographic technique. Sputtering materials usually demand annealing after deposition which involves heating the substrate at 400°–500° C. This process, therefore, excludes polyimide from being used for making the insulating pads 50, because polyimide films decompose upon heating above 400° C. A single pair of electrodes 34a and 60b (i.e., one pixel) thus constructed is shown in FIG. 2.

Turning now to FIG. 1A, the matrix at this stage is ready for the electrochromic materials deposition. However, preferably, though not essentially, the entire array except the areas of the two electrodes of each electrode pair 65a, 65b, 65c and 65d and the area of the substrate between the two electrodes is encapsulated with a thin film of an insulating material 70 (such as the material used for the insulating pads of step 2 of FIG. 1) as depicted in step 3A of FIG. 1A and FIG. 3. Of course, the material of the film must be compatible with contemplated subsequent processing steps. For example, if subsequent steps demand high temperature treatment polyimide should not be used.

Figure 3:
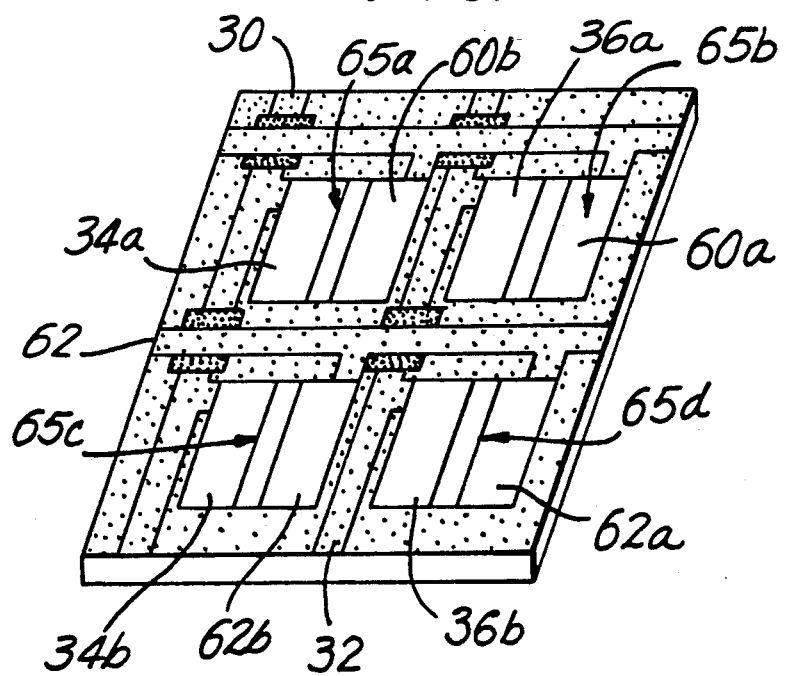
FIG. 3 is an isometric view of another preferred embodiment of side by side disposed electrode pairs of four pixels of an array in accordance with a preferred embodiment of the present invention.

The shaded areas of Step 3A of FIG. 1A and FIG. 3 depict where film 70 is deposited, however, it is omitted from the rest of FIG. 1A for simplicity. The purpose of this encapsulating/insulating layer is to prevent any electrochromic material to be deposited electrochemically in a subsequent step from growing on the bus bars. Such permanent passivation of any electrode (or bus bar) area not to be covered with an electrochromic material is also advantageous from the standpoint that it makes further photolithographic steps to confine electrodeposited material on the electrodes unnecessary. This also prevents any contact of electrochromic material with photoresist, which contact could be detrimental for the electrochromic material. For example we noticed that polyaniline coming in contact with positive photoresist like Shiepley's MICROPOSIT® series leads to a permanent greenish coloration of the polyimide film. This encapsulation is preferably performed in the same manner as the deposition of insulating pads described in step 2 above.

Figure 2A:
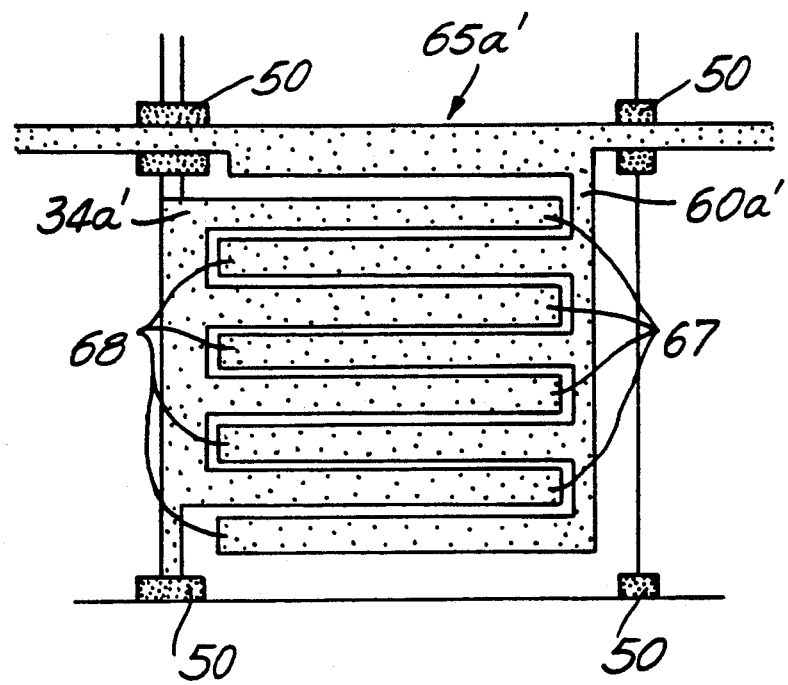
FIG. 2A is a plan view of a pair of side by side disposed interdigitated electrodes of one pixel of an array in accordance with a preferred embodiment of the present invention.
Figure 3A:
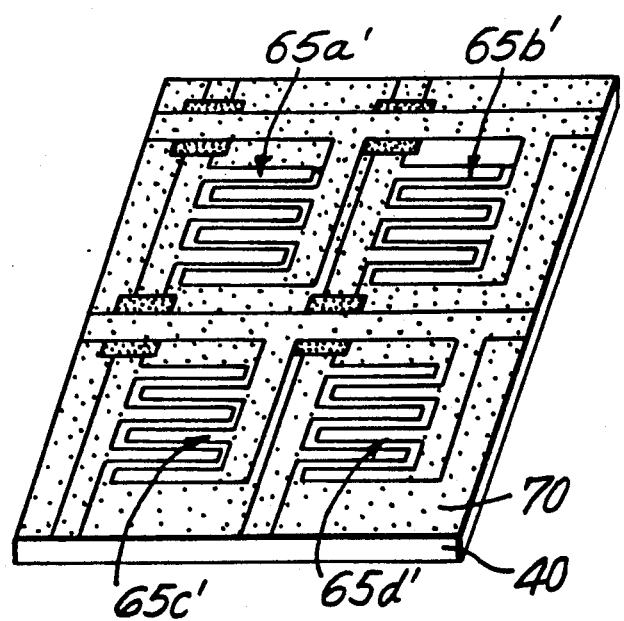
FIG. 3A is an isometric view of side by side disposed electrode pairs of four pixels of an array in accordance with a preferred embodiment of the present invention, where the electrodes of each pair are interdigitated.

Instead of the simple side by side configuration and shape for the electrodes depicted in FIGS. 1, 1A, 2 or 3, it is preferred that the electrodes of each pair are shaped as depicted in FIGS. 2A and 3A. As depicted therein, electrodes 34a' and 60a' of pairs 65a', 65b', 65c' and 65d' have fingers 67 and 68, respectively, which are interdigitated with one another, but not in electrical contact. Such interdigitation of the electrodes provides certain advantages, such as maintaining a relatively constant voltage drop along the fingers of the electrodes. Because of this, the relative potential between adjacent points on adjacent fingers will be approximately the same, minimizing the tendency for the portions of the electrodes of each pair nearest each other to be more strongly colored than farther portions of the electrodes, as might be the case for electrode pairs like those depicted in FIGS. 1, 1A, 2 and 3. However, the method of fabrication of such interdigitated electrodes is otherwise the same as for the arrangement depicted in FIGS. 1, 1A, 2 and 3. Although four fingers are shown, any number, including one for each electrode, may be employed.

If desired, the row and/or column electrodes and bus bars can be embedded into the surface of the substrate. Embedding the bus bars and electrodes allows thicker bus bars and electrodes to be used, thus increasing electrical conductivity. To embed the bus bars and/or electrodes into the substrate, the substrate is first photolithographically etched in the areas where the electrodes and/or bus bars are to be deposited. When the electrodes and/or bus bars are subsequently deposited onto the etched areas as described above, the electrodes and/or bus bars will be at least partially embedded into the surface of the substrate.

Step 4 and Step 5: Turning again to FIG. 1A, row electrodes 60a, 60b and 62a, 62b of each pair are derivatized (i.e. covered) on their outward faces with an electrochromic material 80. The column electrodes 34a, 34b and 36a, 36b of each pair are next preferably derivatized with a material 82 which is electrochemically complementary to the electrochromic material on the row electrodes. By "electrochemically complementary" is meant that when a bias of sufficient magnitude is applied across the electrodes, one of the materials will undergo reversible oxidation while the other material will undergo reversible reduction to substantially the same extent, without chemically altering the electrolyte (to be described below) or the material of the electrodes themselves. This ensures that sufficient redox equivalents (i.e. electrons or holes) will be available on the column electrode to accommodate the redox equivalent requirement of the electrochromic material on the corresponding row electrode, thus preventing oxidation or reduction of the material of the second electrode itself, or of the electrolyte. If a complementary electrochemical material is not included on the second electrode of a pair, changes in the redox state of the electrochromic material 80 on the row electrode cause either corrosion of the column electrode itself or deterioration of the electrolyte, reducing the cycle lifetime of the array. Although the terms "row" and "column" are used to describe the bus bars and electrodes, it is to be understood that these terms are arbitrary and interchangeable.

In the best mode of this embodiment both materials 80 and 82 are electrochromic and preferably both materials are complementarily electrochromic in the sense that one changes from a light (colorless or faintly colored) state to a dark (colored) state when oxidized (i.e. upon the removal of electrons) and the other changes from a light state to a dark state when reduced (i.e. upon the addition of electrons). In this way, both side by side electrochromic material covered electrodes of a pair (i.e. one pixel) will be either dark or light, as desired, when a sufficient potential is imposed between them.

By way of illustrative but non-limiting example, the following pairs of complementary electrochromic materials are particularly suitable for use in the present invention: (a) tungsten trioxide ($WO_3$) and polyaniline; (b) $WO_3$ and poly 3-methylthiophene (p3MeT); (c) viologen, such as is disclosed, for example, in U.S. Pat. No., 4,473,695, and polyvinylferrocene; (d) viologen and poly 3-methylthiophene; (e) $WO_3$ and anodically grown iridium oxide (AIROF). The first material in all these pairs turns from light to dark when reduced, that is when it acquires electrons, and the second material of each pair turns from light to dark when oxidized, that is when it releases electrons. Thus, one material can operate as sink, while the other material can operate simultaneously as a source of reducing or oxidizing equivalents (electrons and holes respectively).

These illustrative pairs operate on the following half cell electrochemical reactions:

(a) tungsten trioxide ($WO_3$) and polyaniline (PA):

$$WO_3 = ne = nM^+ \longrightarrow M_nWO_3 \quad (1)$$
pale yellow → blue $(M^+ = H^+, Li^+, Na+, Ag^+ \text{ etc.})$

$$PA \longrightarrow PA^{n+} + ne \quad (2)$$
pale yellow → blue (b) tungsten trioxide ($WO_3$) and poly 3-methylthiophene:

$$WO_3 + ne + nM^+ \longrightarrow M_nWO_3 \quad (1)$$
pale yellow → blue $(M^+ = H^+, Li^+, Na^+, Ag+ \text{ etc.}$

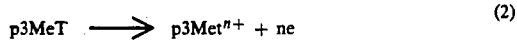

$$p3MeT \longrightarrow p3Met^{n+} + ne \quad (2)$$
red → blue (c) viologen ($V^{2+}$) and polyvinylferrocene (pvFc):

$$V^{2+} + e \longrightarrow V^+ \quad (4)$$
colorless → blue

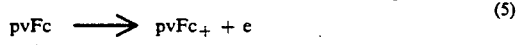

$$pvFc \longrightarrow pvFc_+ + e \quad (5)$$
pale yellow → pale blue (d) viologen and poly 3-methylthiophene;
The half cell reactions are as shown above.

(e) tungsten trioxide ($WO_3$) and anodically grown iridium oxide (AIROF):

$$WO_3 + ne\, nM+ \longrightarrow MnWO_3$$
(1) blue
pale yellow $(M+ = H^+, Li^+, Na^+, Ag^+ \text{ etc.})$

$$Ir_2O_3 + nOH \longrightarrow H_nIr_2O_{n+3} + ne \quad (2)$$
colorless → black The preferred way to deposit $WO_3$ is by sputtering using a $WO_3$ target in an oxygen/argon (20:80) plasma. Patterning of $WO_3$ to cover only the column electrode surfaces can be achieved either by deposition through a mask, or by photolithographic protection of the $WO_3$ at those areas it is going to be preserved, under a photoresist layer. The unprotected $WO_3$ is etched away in a sulfur hexafluoride or a carbon tetrafluoride plasma such as described in Microfabrication of $WO_3$-Based Microelectronic Devices, M. O. Schloh, N. Leventis, M. S. Wrighton, J. Appl. Phys. 1989, Vo. 66, P. 965. Finally the protecting photoresist layer over $WO_3$ is removed either in an oxygen plasma, or by dissolving it with a solvent like acetone.

As described above, the deposition and patterning methods of $WO_3$ employ severe conditions like the use of plasmas ($Ar/O_2$ and $SF_6$ respectively), and a substrate temperature $-400°$ C. during deposition. These conditions exclude the possibility of depositing polyaniline first, because polyaniline is an organic polymer, and as such is unstable at elevated temperatures and in plasma environments. Therefore only after $WO_3$ has been deposited and patterned as described above, polyaniline is deposited by submerging the entire matrix in an aqueous solution of aniline ($-50$ mM)/sulfuric acid (0.5M)/sodium bisulfate (0.5M), and cycling the potential of each row from $-0.1$ to $+0.75$ vs. SCE, until the amount of polyaniline electrochemically equivalent to $WO_3$ has been deposited on the electrodes associated with the row bus bars.

In the case of $WO_3$ and poly 3-methylthiophene, for the same reasons as above, $WO_3$ is deposited and confined on the column bus bar electrodes first. Poly 3-methylthiophene is deposited on the row bus bar electrodes second by submerging the entire matrix in a solution of 3-methylthiophene ($-50$ mM) in acetonitrile/0.5M tetrabutylammonium perchlorate, and cycling the potential of each row from 0.0 V to $+1.8$ V vs. SCE, until the amount of p3MeT electrochemically equivalent to $WO_3$ has been deposited on the electrodes associated with the row bus bars.

In the case of viologen and polyvinylferrocene, viologen is deposited by submerging the matrix in an oxygen free aqueous solution containing 0.5M potassium chloride, 0.5M dibasic sodium phosphate, and $-5$ mM of {N,N'-bis[-3-(trimethoxysilyi) propyl]-4,4'-bipyridinium} dibromide, and cycling the potential of each column (or row, as appropriate,) electrode from 0.0 to $-0.75$ V vs. SCE. Polyvinylferrocene is preferably deposited from a 50 mM solution of polyvinylferrocene in methylene chloride by holding the potential of the row (or column) bus bar at $-+0.6$ V vs. SCE, until an electrochemically equivalent amount of polyvinylferrocene has been deposited on the row bus bar electrodes. In this case the conditions for the deposition of each material are completely safe for the other material, so that the deposition sequence is of no importance.

In the case of viologen and poly 3-methylthiophene, the conditions for the deposition of each of these materials were described above, and they are safe for the deposition of the other. Therefore the deposition sequence is of no importance.

In the case if iridium oxide and $WO_3$, iridium oxide can be formed by subjecting the iridium film to an oxidizing potential ($-+0.5$ V vs. SCE) in a dilute sulfuric acid solution. The preferred sequence here is to first deposit and photolithographically confine iridium metal over the electrodes associated with the column bus bars, and then to deposit and confine $WO_3$ over the electrodes associated with the row bus bars. Finally the iridium metal over the column bus bar electrodes will be oxidized anodically by submerging the matrix in a sulfuric acid solution and potentiostating the column bus bars at $-+0.5$ V vs. SCE.

Figure 6:
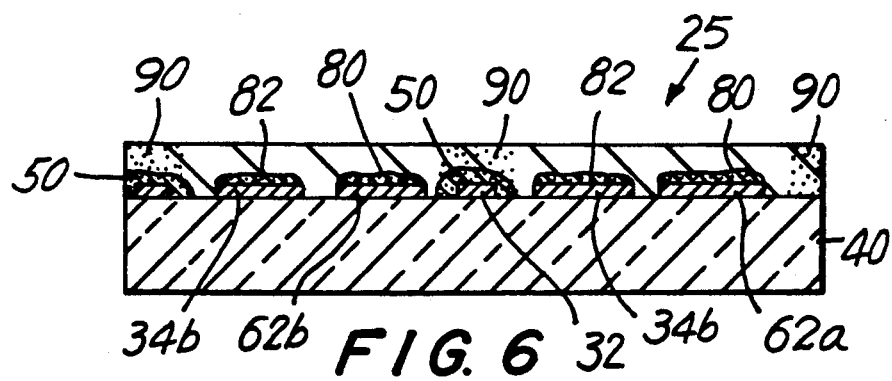
FIG. 6 depicts a cross-sectional view of a portion of the array depicted in FIG. 1A, taken along the line 6—6 of FIG. 1A.

Preferably, as depicted in FIG. 6, the electrochromic material 80 on the row electrode of a given pair is not in contact with the other electrode of the pair or its redox active material 82. Such an arrangement will prevent "shorting" of the electrodes of the pair and give the pixel a "memory" such that, once a particular redox state of the materials 80 and 82 on the electrodes is obtained by application of a potential to the pair of electrodes, that state will be reversibly maintained for a relatively long period of time without further application of power, analogously to the charging of a battery. However, if no memory is desired, the materials can be placed in contact.

Step 6: An electrolyte 85, preferably a solid electrolyte, is spread on top of the array. The electrolyte 85 plays the same role as the electrolytic solution plays in a liquid cell (e.g. sulfuric acid in a lead acid battery). The solid electrolyte material is preferably durable and is applied in a thin layer. This eliminates the problem of leakage, and gives the desirable features of an all solid state electrochemical/electrochromic cell.

Sold electrolyte systems which may be used for the present invention include $\beta$-alumina, and resin gels containing sulfuric acid. $\beta$-alumina has the disadvantage that it is ionically conductive only at elevated temperatures, while acidic gels are prone to yield hydrogen evolution at the cathode, with detrimental effects on the ionic conductivity. "Aprotic" polymeric solid electrolytes that conduct substantially around room or even lower temperatures are preferred. A preferred though non-limiting example is poly{bis-[methoxyethoxyethoxy]phosphazene}/lithium triflate. The deposition is done preferably by spin-coating a solution of the solid electrolyte in some solvent, and then letting the substrate dry in a controlled atmosphere. For example polyvinylalcohol/phosphoric acid is spread as a dense (viscous) aqueous solution and is allowed to dry at 35° C. in the air. Preferably it is then placed for at least two hours in a water saturated argon atmosphere before the next step.

Polyethylene oxide/lithium triflate, as another example, is preferably spread as a dense solution in anhydrous acetonitrile under dry conditions, and the coated substrate is let to dry under dry argon. The same applies for the polyphosphazene/lithium triflate system.

Step 7: This step comprises a new method to pattern the ion-conductive areas of a solid electrolyte film, to essentially "build" in place ionically insulating border regions between ionically conductive electrolyte areas.

Each pair of the derivitized electrodes 36a, 60a; 36b, 62a; 34b, 62b or 34a, 60b (i.e. one pixel) is covered with a layer of electrolyte 85, preferably a substantially solid polymer electrolyte such as poly{bis-[methoxyethoxyethoxy]phosphazene}/lithium triflate. Preferably, the entire array is covered with the electrolyte as by, for example, spin coating. The layer of electrolyte 85 associated with a pair of electrodes includes and is surrounded by a relatively non-conductive border region 90 so that each pair of derivatized electrodes and its associated zone of the layer of electrolyte is a single substantially independent electrochemical cell, relatively unaffected by the redox state of adjacent cells, including those longitudinally connected to a particular row or column bus bar. This non-conductive border 90 is depicted in the last figure of FIG. 1A and in FIG. 6. Thus, cross-talk between pixels, even along a single bus bar, is substantially eliminated.

The preferred method of building the border region is a photolithographic method and is based on electromagnetic radiation induced reduction of the ionic conductivity of the electrolyte. For instance, the conductivity of poly{bis-[methoxyethoxyethoxy]phosphazene} decreases by crosslinking upon exposure to peroxides, sulfur and radiation as is stated in "Polyphosphazenes: Performance Polymers for Specialty Applications", by H. R. Penton in "Inorganic and Organometallic Polymers", ACS Symposium Series 360, edited by Martel Zeldin, Kenneth J. Wynne, and Harry R. Allcock.

The electromagnetic radiation, preferably gamma, X-rays or ultraviolet radiation, is shown onto the electrolyte layer through mask 100. The dark areas 101 of mask 100 prevent exposure of the electrolyte in the regions 92 covering the electrode pairs s that these regions remain ionically conductive. Electromagnetic radiation goes through light areas 102 of mask 100 to expose the underlying electrolyte layer in the border regions 90 surrounding the electrode pairs. The radiation induces cross-linking the polymeric backbone of the solid electrolyte in regions 90, decreasing its ionic conductivity in the exposed regions.

Another preferred embodiment of this method is to mix into the solid electrolyte a UV-sensitive monomer or oligomer, which upon exposure to UV-light induces crosslinking of the monomer or oligomer with itself or the polymeric backbone. Possible crosslinkers for the case of poly{bis-[methoxyethoxyethoxy]phosphazene} include illustratively, divinylbenzene or vinyl acrylate and similar compounds that are able after photoexitation, to connect the polyphosphazene chains in a three dimensional network. It is believed that this is accomplished by attacking the alternating double bonds of the polyphosphazene polymeric backbone, following a radical type mechanism.

Eventually the unpolymerized crosslinker can be removed either by applying vacuum or by heating the substrate, or it can be washed away using a solvent system that leaves the rest of the materials on the matrix intact. Which method is preferably followed depends on the crosslinker, and the materials on the array. The crosslinker can also be left on the array permanently as long as it is electrochemically inert with the range of voltages applied during use of the array to address the electrochromic materials in the electrode pairs of the array. Then in order to protect the array from the detrimental effects adventitious UV-light may have on it during its useful life (that is, to prevent unintended cross-linking of the remaining crosslinker) the array is preferably encapsulated (i.e., covered) with a front near-UV filter, such as common glass. The completed array 25 (without the cover) is depicted in the final figure of FIG. 1A.

Another illustrative but non-limiting example of the method for patterning the conducting regions of a solid electrolyte is to photorelease a substance that reduces the mobility of the current supporting ions in the exposed areas. For instance, incorporation of a metal complex that can photorelease water in the polyethylene oxide/lithium triflate solid electrolyte system, can render the electrolyte system ionically non-conductive by photosolvating the lithium ions upon exposure to UV-light.

Finally, in another non-limiting example of a variation of the present method, a substance that can photorelease a base (e.g $[Co(NH_3)_6]Cl_3$, $[Ru(NH_3)_6]Cl_3$, $[Co(NH_3)_5Cl]Cl_2$ etc.) is incorporated in a solid electrolyte system like polyvinylalcohol/phosphoric acid. Upon photoexitation a base is released ($NH_3$ for the three substances cited as examples above) that reacts with the protons that are responsible for charge transport in this solid electrolyte thus decreasing the ion conductivity in the exposed areas. For instance, we have discovered that by incorporation of $[Co(NH_3)_5Cl]Cl_2$ in a polyvinylalcohol/phosphoric acid film and upon irradiation of the film with electromagnetic irradiation at 254 nm, the ion conductivity of the film decreases by a factor of 13.

Disposing both electrodes of each pair side by side on one substrate makes alignment of the column and row electrodes very easy by conventional microfabrication techniques. The lower limits in feature size then can be as low as the limits the standard VLSI technology can achieve, that is less than 1 micron. This miniaturization also decreases the RC time constant for the charging of the electrodes of each pixel which in turn increases the response time of each pixel and of the matrix as a whole. Feature size of less than about 75 microns is believed to give the best combination of ease of fabrication and good operation without preferential coloration. In addition, the miniaturization increases the resolution of electrochromic screens, and reconfigurable projection devices become easy to manufacture. Minimum feature size for the two dimensional arrays of electrochemical cell as are described herein is defined as the distance between the two electrodes of each electrode pair.

Pixel size as small as two microns across is possible with arrays constructed in accordance with the present invention. For arrays used as visual displays, pixel size should be between about 2 microns and 250 microns across for good resolution. Pixel size between 2 microns and 75 microns is preferred, as being reasonably easy to fabricate, but much smaller than normal human visual acuity. Where interdigitated electrodes are employed, the individual pixel may be of any size, including several inches across, but the width of the fingers is preferably greater than about 2 microns and less than about 50 microns for best performance and minimization of preferential coloration of portions of the electrodes. Of course, although an array having four pixels has been described, the array may have any number of pixels.

The array of the present invention having electrodes of each pair arranged side by side and on the same substrate described above with respect to FIGS. 1, 2, 2A, 3, 3A and 6 is also of great advantage applied to emissive arrays such as those utilizing electroluminescent substances and those utilizing electrochemiluminescent materials. The preferred feature size and pixel size of these arrays are the same as for the electrochromic displays described above.

Figure 4:
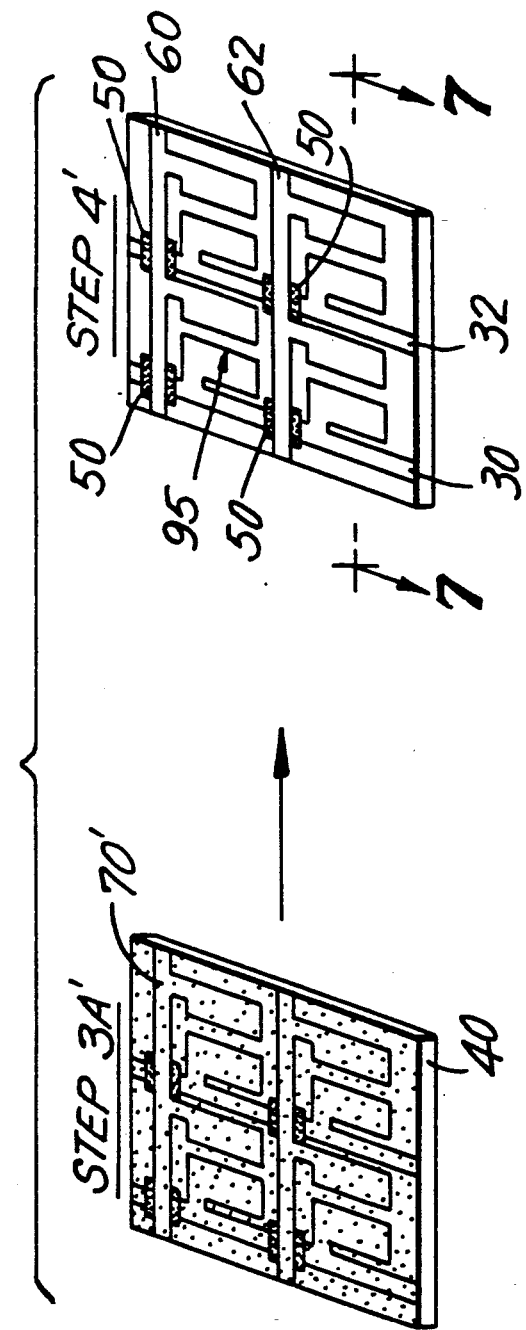
FIG. 4 depicts in step by step sequence a preferred method of fabrication of an emissive array of electroluminescent pixels in accordance with a preferred embodiment of the present invention using an array of pairs of electrodes depicted in FIG. 1.
Figure 7:
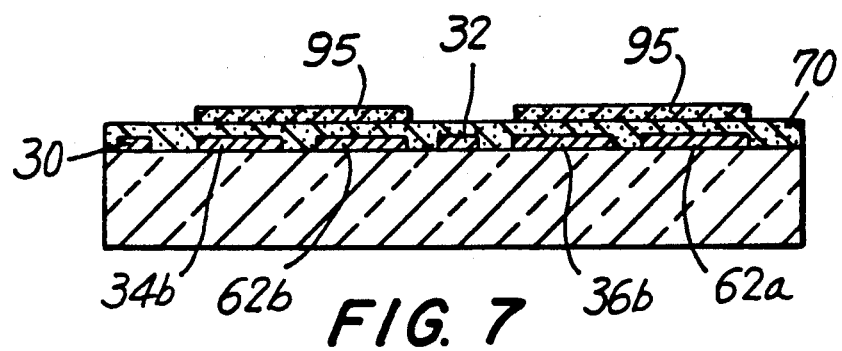
FIG. 7 depicts a cross-sectional view of a portion of the array depicted in FIG. 4, taken along the line 7—7 of FIG. 4.

Referring now to FIGS. 4 and 7, a preferred method of construction of an electroluminescent array and an array so constructed are depicted. As depicted, the array of side by side row and column electrodes is built as described with respect to steps 1 through 3 of FIG. 1. In step 3A' of FIG. 4, however, it is desirable with electroluminescents to have the electroluminescent substance insulated from the electrodes themselves. Therefore, the entire array, including the electrodes, is preferably covered with insulating film 70' in step 3A'. This step can be omitted, if desired.

Next, in step 4', each pair of electrodes of the array is covered with a layer of an electroluminescent substance 95 such as, for example, manganese doped zinc sulfide. Preferably, the electroluminescent covering over each electrode pair is isolated from the electroluminescent covering over adjacent electrode pairs.

The electroluminescent material over and between the electrodes of a pair will luminesce upon application of a bias of sufficient magnitude between the row and the column at the intersection of the electrode pair. The preferred embodiment of the array is one where the two electrodes of each electrode pair are interdigitated, as depicted in FIGS. 2A and 3A. This is because light will be emitted from all the interfinger areas, thus giving increased luminance density compared to the non-interdigitated electrode pair configuration. Thus, the configuration of the present invention will approach the luminosity of the conventional sandwich structure, while having higher resolution and being easier to fabricate.

The advantages achieved by construction of the present invention over conventional sandwich constructions of electroluminescent arrays with row and column bus bars and electrodes on two different and opposing substrates include the following:

1. Much higher density of pixels with all electrodes on a single substrate because all the manipulation can be done with conventional alignment instrumentation, customarily used in VLSI photolithographic techniques. Thus, the array itself can be made with line separation in the range of one micron and the electroluminescent material can be confined over the electrode pairs with similar spatial accuracy.

2. Both electrodes and bus bars can be of metal thus avoiding the need to address the pixels through resistive tin oxide electrodes as it is necessary in the conventional "sandwich" configuration.

The array of the present invention having electrodes of each pair arranged side by side on the same substrate is also useful in electrochemiluminescent displays. Electrochemiluminescent materials are substances A, which have stable oxidized ($A^+$) and reduced ($A^-$) forms, both of which are reversibly and electrochemically accessible, that can react with each other in an annihilation fashion to yield substance A, some of which are in an electronically excited state ($A^*$) that can relax to the ground state (A) by emission of one photon of light.

The above process can be formulated in chemical equations and can be written as follows:

$$A + e^- \rightarrow A^- \qquad (1)$$

$$A \rightarrow A^+ + e^- \qquad (2)$$

$$A^+ + A^- \rightarrow A^* + A \qquad (3)$$

$$A^* \rightarrow A + h\nu \text{ (light)} \qquad (4)$$

The oxidized and reduced forms of A can be produced electrochemically, i.e. preferably via fast cycling of the potential of a pair of electrodes immersed in a solution of A. Thus, no net chemical change happens on the bulk of the electrolyte since A is regenerated.

The generation of $A^+$ and $A^-$ can be induced with different electrodes where a bias large enough has been applied. Thus both reactions (1) and (2) take place simultaneously and to the same extent if electrolyte and electrode are inert, and in such a way that reaction (1) happens on the negative electrode and reaction (2) on the positive electrode. After their generation $A^-$ and $A^+$ diffuse away from their generation sources (i.e. the electrodes) and eventually meet each other somewhere between the two electrodes. Then reactions (3) and (4) take place with generation of light.

There are many substances that can play the role of A in the present invention. Preferably, substance A is soluble in the solid electrolyte employed. Combinations of solid electrolyte/electrochemiluminescent substances useful in the present invention include:

polyethylene oxide/lithium triflate//rubrene or anthracene; or poly[bis-(methoxyethoxyethoxy)phosphatene]/lithium triflate//Re(CO)$_3$, (1, 10-phenanthroline).

Figure 5:
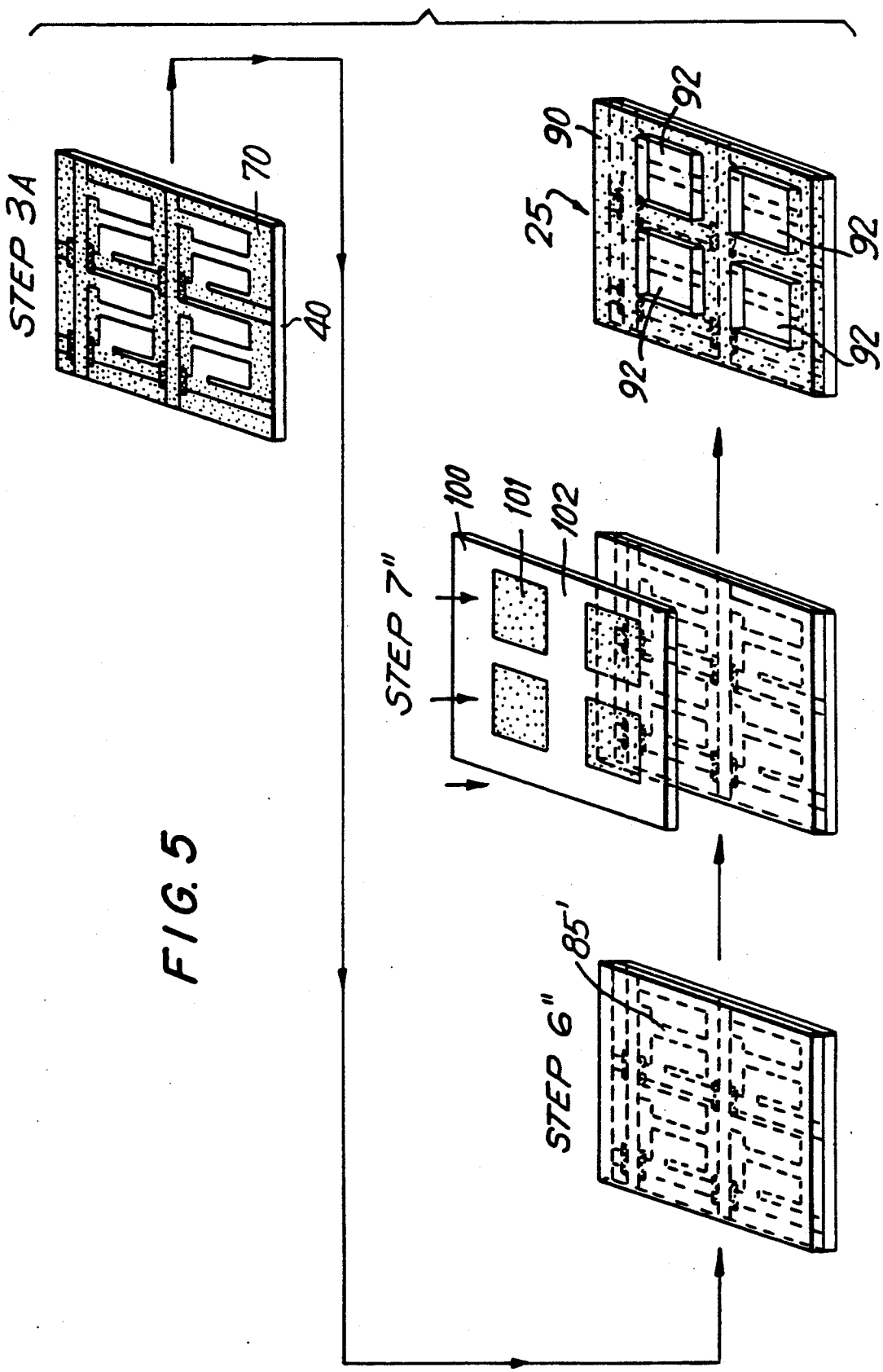
FIG. 5 depicts in step by step sequence a preferred method of fabrication of an emissive array of electrochemiluminescent pixels in accordance with a preferred embodiment of the present invention using the array of pairs of electrodes depicted in FIG. 1.
Figure 8:
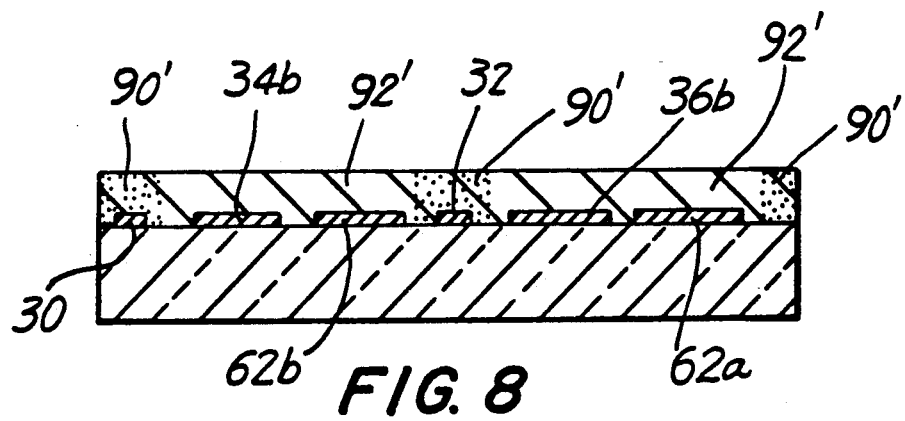
FIG. 8 depicts a cross-sectional view of a portion of the array depicted in FIG. 5, taken along the line 8—8 of FIG. 5.

Referring now to FIGS. 5 and 8, a preferred method of construction of an electrochemiluminescent array and an array so constructed are depicted. As depicted, the array of side by side row and column electrodes is preferably built as described with respect to steps 1 through 3 of FIG. 1 preferably including step 3A of FIG. 5 where the entire array except for the electrodes themselves and the interelectrode space is covered with an insulating film 70, in the same manner as described with respect to the FIG. 1A embodiment. However, because in an electrochemiluminescent array, the electrochemiluminescent substance is mixed into the electrolyte itself, rather than being coated onto the electrodes, the steps 4 and 5 of FIG. 1A having to do with coating the electrodes are not required.

Step 6" is preferably accomplished in the same manner as Step 6 of FIG. 1A, the only exception being that the electrochemiluminescent substance is mixed into the electrolyte 85', preferably before the electrolyte 85' is applied. Of course, if a monomer or oligomer or other photosensitive substance is included in the electrolyte, the electrochemiluminescent substance must be compatible with (i.e. nonreactive with) the monomer or oligomer or other photosensitive substances.

The preferred embodiment of an electrochemiluminescent display in accordance with the present invention has side by side electrode pairs with the photoconductivity patterned solid electrolyte as described above with respect to the electrochromic embodiment of FIG. 1A. The masking and selective exposure of the electrolyte to U.V. radiation depicted in step 7" is accomplished in the same manner as described with respect to step 7 of FIG. 1A.

The active component, i.e. the electrochemiluminescent compound, instead of being dissolved in the solid electrolyte before it is spread on the surface of the matrix, may also be incorporated at the end, after the array has been covered with the solid electrolyte film. In this case, after the ion-conductivity of the film has been patterned, the conductivity-patterned solid electrolyte covered array is exposed to vapors of the electrochemiluminescent substance, such as anthracene, which will diffuse into the electrolyte.

The integrated configuration of electrode pairs as depicted in FIGS. 2A and 3A is preferable because it provides more interelectrode spaces where the A+ and A− can meet and annihilate each other, provides less distance for A+ and A− to travel (by diffusion) before they meet, which makes response of the matrix faster, and permits all electrodes to be made of metal and on the same substrate for ease of fabrication and improved conductivity.

Another embodiment of the present invention as a luminescent display is a configuration in which the array is covered with a patterned solid electrolyte layer in which a compound has been dissolved that can be triggered by UV-light to luminesce only from one of its redox states. Compounds having this property are anthraquinone or other substituted anthraquinones which upon reduction yield 9, 10-dihydroanthracene which luminesces green light upon UV-light excitation.

In a preferred embodiment of this application we prefer either anthraquinone-1,5-disulfonic acid dissolved in polyvinylalcohol/phosphoric acid or 2-carboxyanthraquinone covalently bound on polyvinylalcohol as an ester, which in turn is deposited on an electrode. In the latter case the solid electrolyte can be polyvinylalcohol/phosphoric acid while the counter electrode can be derivatized with polyvinylferrocene in a complementary counterelectrode fashion. In other respects, the construction and operation of such an array is the same as for the electrochromic array described in FIGS. 1, 2, 2A, 3, 3A and 6.

An array in accordance with the present invention having conductivity patterned electrolyte is also useful in "sandwich" array configurations. FIGS. 9 and 9A illustrate the preferred steps to be followed to make a sandwich electrochromic array in accordance with the present invention, i.e., one in which two different substrates are used for the column and the row bus bars, and their associated electrodes, respectively, and where the row and column bus bars on respective substrates are oriented perpendicularly to one another with the respective electrochemical/electrochromic materials facing each other with a layer of electrolyte patterned in accordance with the present invention sandwiched between them.

In the embodiment depicted in FIGS. 9 and 9A, the electrodes 108 and 109 on the substrates I and II, respectively, are preferably integral with the bus bars themselves. The confinement of the electrodes in rows can be done either photolithographically or directly, as by deposition through the mask. Of course, in this embodiment, at least one of the substrates as well as the electrodes of at least one substrate have to be transparent. Otherwise, color changes that will happen inside the final assembly would not be visible. Therefore, at least one of the substrates, for example substrate I, is made of clear glass or plastic, and the associated electrodes are made of tin oxide or indium oxide, which are conductive and transparent. The deposition of the transparent electrodes in this case is preferably achieved as described in the discussion of steps 1 and 3 in FIG. 1 above, i.e. by vacuum deposition or sputtering followed by a photolithographic step of dissolving the oxide away from where it is not needed with a dilute solution (−1%) of hydrogen fluoride.

The method of deposition of blocks of electrochromic materials 105 and 106 will now be described. Examples of preferred pairs of materials and methods of confinement were given in the discussion of steps 4 and 5 in FIG. 1A. The deposition sequence is irrelevant in this case because the two materials were confined on two different substrates. As described there, the confinement of tungsten trioxide and iridium oxide in blocks can be done photolithogaphically. The confinement of the electrochemically deposited electrochromic materials (like viologen, polyvinylferrocene, polyaniline, poly 3-methylithophene etc.) is preferably achieved differently because, as was mentioned before, these materials should preferably not come into contact with the photoresist. Therefore the confinement of these polymers in blocks is preferably accomplished by protecting the areas between where blocks of electrochromic materials are to be deposited with a very thin film of some insulator (like polyimide, silicon nitride or silicon dioxide), that is going to stay in this position permanently, (similar to the manner described in step 3 in FIG. 1). If greater simplicity in manufacture is important, the electrochromic material can also be deposited in strips along the entire length of the bus bars, rather than in separate blocks, with some loss of immunity to crosstalk.

After the electrochromic materials have been deposited and confined in place, a solid electrolyte 85 is spread on top of either or both of substrate I and II. Of course, the same procedure for deposition of the electrolyte described with respect to the embodiment of FIG. 1A can be employed. Preferably, a photochemically activated crosslinker, or a photosensitive compound that upon light actuation can release a substance that renders the current supporting ions within the solid electrolyte relatively immobile, such as in the discussion of step 6 in FIG. 1A, is also included in the electrolyte.

Continuing now with FIG. 9A, the two substrates I and II, either or both of which are covered with a thin film of a solid electrolyte, are next brought into contact with their respective electrodes 108 and 109 generally perpendicular to each other and so that each block 105 of electrochromic material on the one substrate I faces and is aligned to coincide exactly with one block 106 of the material on the other substrate II. The thin layer of the solid electrolyte 85 then plays the role of a spacer between the two substrates. A final sealing around the edges of the completed assembly is achieved preferably either with epoxy glue or with silicon rubber or preferably with a combination of both.

Subsequently the array is exposed through mask 110 to UV-light so that the areas 115 of the solid electrolyte surrounding each pair of opposing electrodes defining a pixel become relatively ionically non-conductive either by cross-linking, immobilization of the current supporting ions, etc., in the manner described above with respect to step 7 of FIG. 1A. Thus an array of individual electrochromic/electrochemical cells is defined having each pixel/cell surrounded and separated from each other by relatively insulating walls in the electrolyte layer. The completed array 26 is depicted in the final figure of FIG. 9A.

Because the geometry of this array generally requires that the electrolyte layer remain sandwiched between the substrates, the completed array generally retains the cross-linker or the photosensitive substance in the portion of the solid electrolyte which occupies the space between each pair of electrodes. To avoid a decrease of a period of time of the ionic conductivity of the solid electrolyte in these areas caused by the UV portion of the ambient light, the materials for substrates I and II are preferably selected to meet the following requirements: Since the structure of FIG. 9 is exposed through the substrate II to pattern of electrolyte, substrate II must be transparent to the exposing energy, i.e., UV-light. Substrate I must be transparent (so that the array will be visible in use) but possess a UV cutoff very near to the visible portion of the electromagnetic spectrum, thus preventing adventitious ambient UV from causing deterioration of the electrolyte in use. That is, the matrix of FIG. 9 is exposed in order to pattern the functionality of the solid electrolyte through substrate II, but after this step has been accomplished, rear surface of substrate II is protected permanently with an opaque or UV-light impermeable cover and the completed assembly viewed after fabrication through substrate I, so that no adventitious UV-light will penetrate inside the matrix.

The pixel size of the sandwich electrochromic array with exposing substrates in accordance with the present invention is generally limited by how well the square blocks of the one substrate can be aligned with the square blocks of the other, rather than by how small the blocks of the solid electrolyte can be made. In general, the alignment of the two substrates can be achieved reproducibly within a few microns. By contrast, reported techniques, like polymer electrolyte lift-off by underlying photoresist proposed in U.S. Pat. No. 4,488,781 allow definition of the solid electrolyte in stripes with dimensions of approximately 0.017 inches (431.8 microns.).

An array in accordance with the present invention preferably uses complementary electrochemical/electrochromic materials 105 and 106 for the electrodes 108 and 109 on substrates I and II, respectively. This minimizes unwanted side reactions at the second electrode such as degradation of the electrolyte and increases the cycle life of the array. Furthermore, use of isolated blocks of solid electrolyte associated with the single pair of electrodes, instead of stripes of solid electrolyte continuous along each row or column, as in U.S. Pat. No. 4,488,781 essentially eliminates even the cross-talk along one line. Furthermore, fabrication of an array in accordance with the present invention should require less labor than arrays in accordance with U.S. Pat. No. 4,488,781, owing to the one step photopatterning process of the ionic conductivity compared to the several step process of U.S. Pat. No. 4,488,781.

The sandwich configuration as of FIG. 9 may also be employed for an electrochemiluminescent display, where the electrolyte has been photo-patterned in accordance with the present invention.

Figure 10:
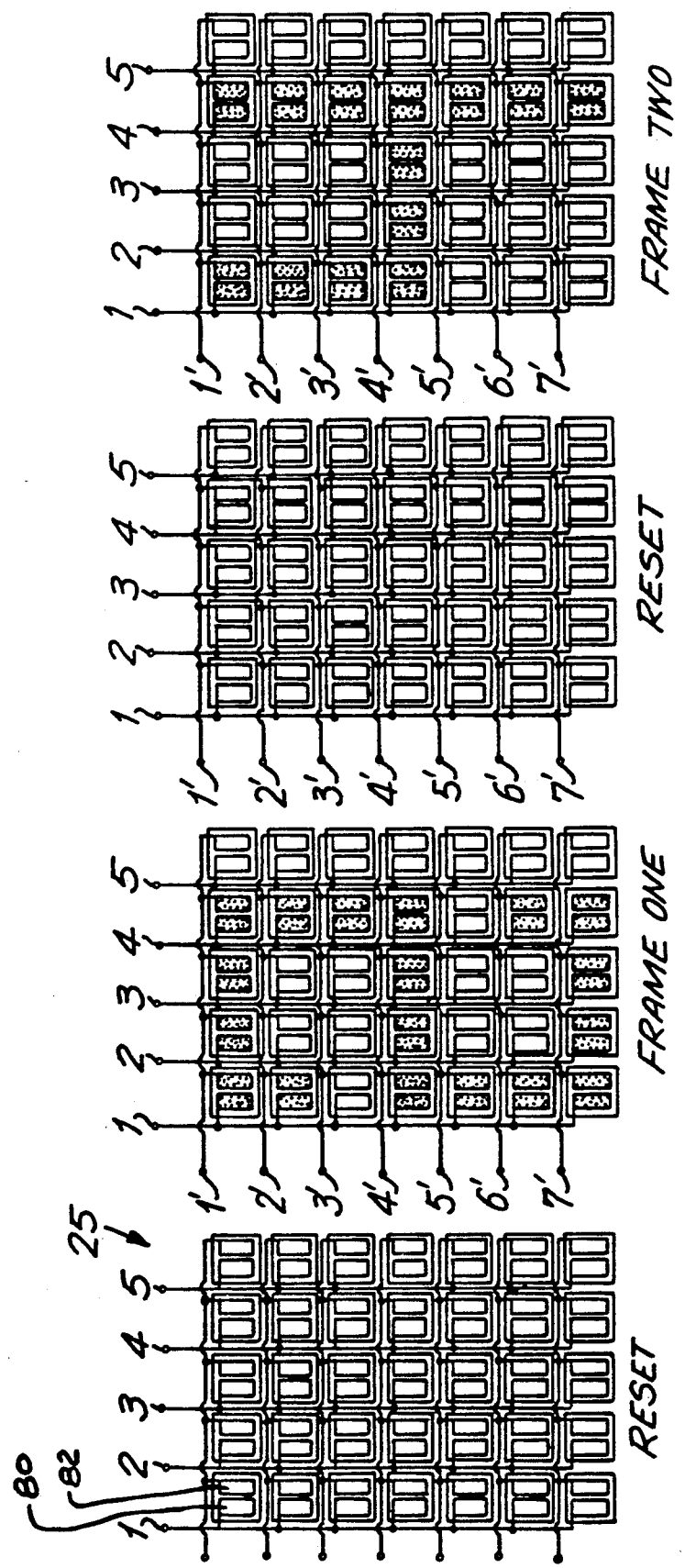
FIG. 10 depicts in plan view a five by seven array of side by side disposed pairs of electrodes in four states: uncolored reset state, matrix addressed state so that the pixels form a "2", an uncolored reset state, and a matrix addressed state so that the pixels form a "4"

Turning now to FIG. 10, the operation of an electrochromic array constructed in accordance with the present invention to display information will now be described. In this example, an array 25 of the type described in FIGS. 1A and 3 is used, including pixels with two complementary electrochromic materials, under a layer of a solid electrolyte, the functionality of which has been patterned in accordance with the present invention to crease separate blocks of ion-conductive electrolyte for each pair of electrodes surrounded by substantially non-conductive border regions.

The following describes, by way of example, how this array can be electrically addressed in order to display the number "2", and how this displayed information can be changed to something else, for example, to the number "4". The array used in this example is of the 5×7 type that is customarily used for the display of alphanumeric information. Of course the example is not intended to be limiting either on the size of the matrix or the kind of information to be displayed. The same addressing concepts can be used to display pictures.

The 5×7 array of this example preferably accomplishes this task in the following four steps:
Step 1: Reset the array;
Step 2: Display "frame one";
Step 3: Reset the array;
Step 4: Display "frame two".

The array 25 is powered by a power supply (not shown) through a computer controlled series of switches (not shown) that can connect any row or column bus bar (from now on called simply "row" or "column") to either the "+" or the "−" terminal of the power supply, or disconnect any row or column from any active control when desired. A pixel is colorless when its column bus bar is at "−", and its row bus bar is at "+"; and a pixel is colored when its column bus bar is at "+", and its row bus bar at "−". The potential difference between the "+" and "−" terminals for the coloration reaction to be affected must be at least equal to the threshold voltage for the coloration reaction, which is approximately equal to the difference in the formal redox potentials of the two redox active materials on the two electrodes of each pixel. It should also be noted that a pixel retains its colored state when at least one of its connections to the power supply is removed while the pixel is at the colored state under consideration due to the memory effect of the electrochromic materials.

Step 1: This step clears the matrix, and prepares it to accept a new frame. In the present example this is accomplished by connecting simultaneously all columns to "−" and all rows to "+".

Step 2: Display "frame one". This is accomplished by writing one line (i.e. a single row) at a time by coloring the appropriate pixels of each line, in a line-at-a-time pace. It is necessary to write only one line at a time because if two or more rows are addressed simultaneously, additional unwanted pixels may color. Each row is addressed by connecting it to "−". While each row is being addressed, the columns are held either at "+" if the pixel at the intersection of the particular row and the corresponding column is to be colored, or if this pixel has to remain colorless, the corresponding column can be either let to float (i.e. be unconnected to either "+" or "−"), or it can be connected to "−". Subsequently, in order to address the next row, first the presently addressed row is disconnected from "−" an is let to float. Then the addressing configuration of the columns is changed to the appropriate configuration for coloring the appropriate pixels of the next row, and then the next row is connected to "−". When all the pixels of the array have been written this way, writing starts again from the top row and so on, this process taking place periodically as long as the present frame has to be shown. This process is called refreshing and helps keep a sharp image.

Step 3: To change the displayed image, the entire array is again reset as described in step 1.

Step 4: Display step 4 in a line-at-a-time fashion in the manner described above for step 2.

Alternately, steps 3 and 4 above can be combined into a single step. That is, when it is desired to change the displayed "2" to a "4", only those pixels whose colored/uncolored states are required to be changed are changed by reversing the polarity of the voltage applied at each required address location in the line-by-line manner described in step 2 above.

Figure 11:
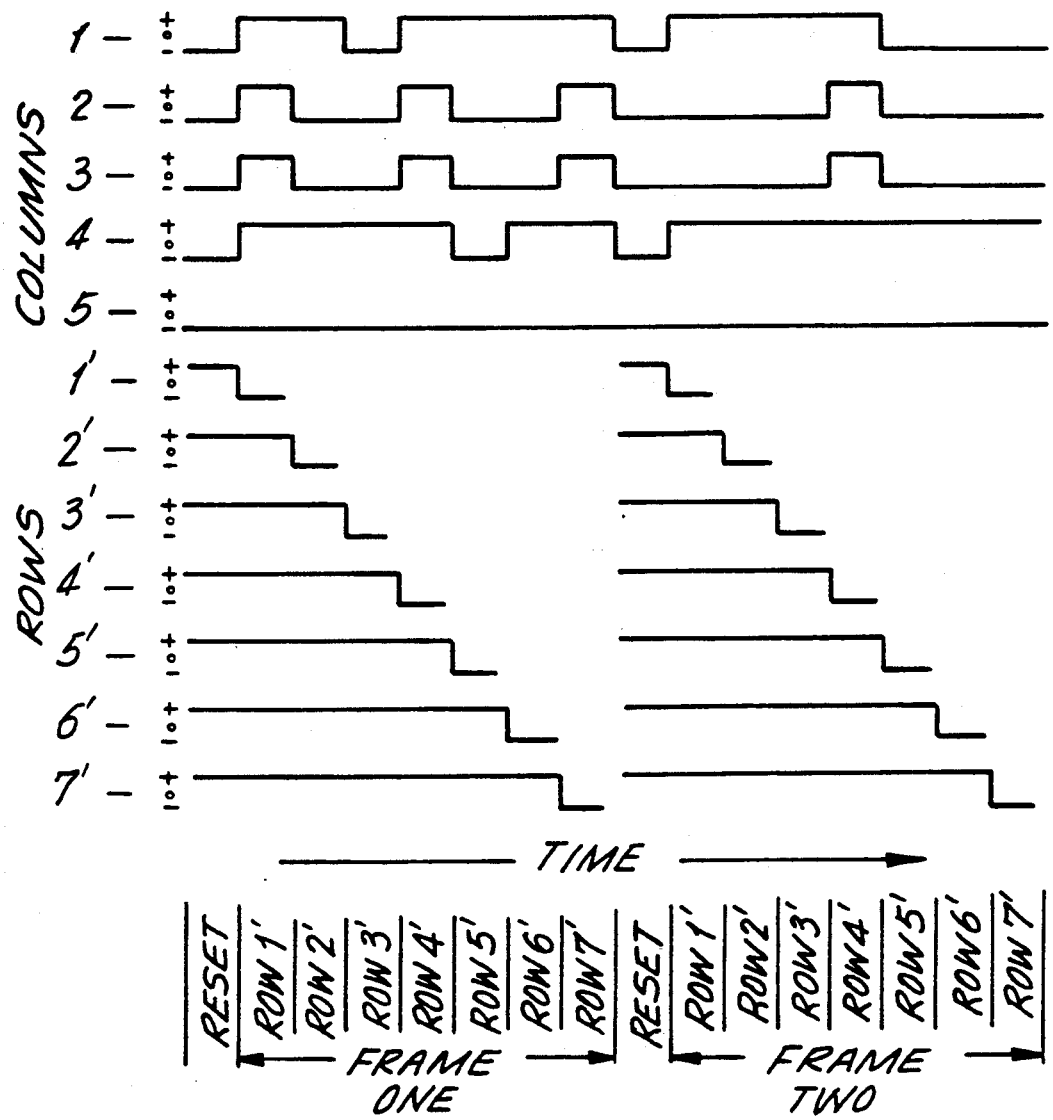
FIG. 11 graphically depicts a first multiplexed addressing scheme of row bus bars and column bus bars.
Figure 12:
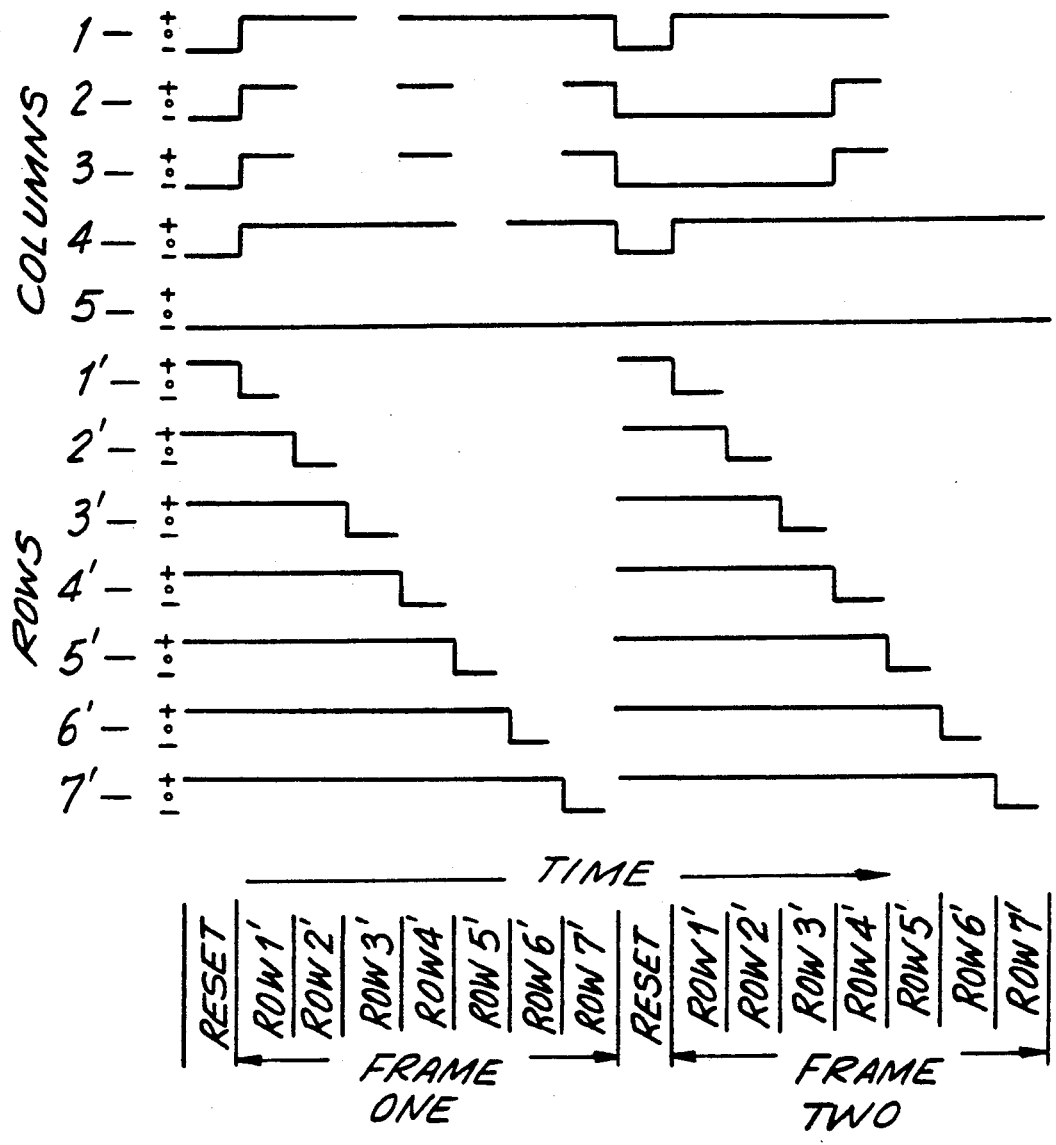
FIG. 12 graphically depicts a second multiplexed addressing scheme of row bus bars and column bus bars.

The connection of the columns or the rows to the "+" or the "−" terminals of the power supply, can be thought of as a train of synchronized pulses (positive or negative) directed simultaneously to the columns and the rows of the matrix. FIGS. 11 and 12 demonstrate such trains of pulses that can accomplish the task as described in FIG. 10. It should be note that the duration of the negative pulse at each row is a little shorter than the pulse to the columns. This means that before control is transferred to the next row, the present row is first disconnected and only then the signal configuration on the columns is changed in order to write the next row.

FIG. 11 demonstrates the train of pulses where the columns of unselected pixels are held negative. FIG. 12 depicts the train of pulses where the columns of unselected pixels are allowed to float.

Finally, in another illustrative addressing scheme, each row after it has been addressed may be connected to positive. However, in this illustrative scheme, this row will be erased and no advantage will be capitalized from the memory effect of electrochromic materials.

Addressing of the array as an electroluminescent or electrochemiluminescent display of the type described above involves the application of a bias between the columns and the rows in a line/at/a/time fashion as described in FIGS. 11 and 12 in relation to FIG. 10, except that electroluminescent and electrochemiluminescent displays do not have "memory" in the sense that electrochromic displays do, and therefore do not require "resetting" but require more frequent refreshing.

A reconfigurable projection device, that is, a transparent "slide" which may be electrically reconfigured to display different images or information when light is shone through it may be constructed using electrochromic arrays in accordance with the present invention. By appropriate selection of electrochromic materials employed, or an overlay of colored materials, a color display may be constructed. A reconfigurable projection device in accordance with the present invention may include a single array 26 such as described in FIG. 9, for example, or two or more laminated layers of such arrays.

The present invention may be used as a reconfigurable photomask for the microfabrication of integrated circuits. Such a reconfigurable photomask could replace the multiplicity of photomasks presently necessary for making an integrated circuit by only one mask that can assume many configurations at will by matrix addressing. Such an application takes advantage of the fact that very small size pixels, in the range of a few microns, can be fabricated using arrays in accordance with the present invention. It is preferred that these pixels be as small as possible for best resolution, but pixels as large as 250 microns or greater may be employed with suitable reduction optics.

A reconfigurable photomask for the purpose stated above should have the ability to selectively color/bleach each pixel of the entire surface of a matrix, and particularly the area between the pixels, although it is not necessary to create the entire pattern at one time. That is, a reconfigurable photomask in accordance with the present invention may selectively color/bleach as little as a single pixel at a time. This can be done repeatedly, pixel by pixel, until the desired pattern to be exposed on the substrate of the integrated circuit (corresponding to one photomasking step) is completed, provided that the aggregate of all pixels of the area of the photomask gives complete control over the trasmissivity or opacity of the area on a pixel/by/pixel basis. This process is repeated for subsequent manufacturing steps requiring a different pattern. Although the actual exposure of the substrate of the integrated circuit pixel/by/pixel method may take longer than the actual exposure step of the conventional masking process, any additional exposure time is more than compensated for by the savings in time and manufacturing steps made possible by use of a single, electrically reconfigurable photomask instead of several steps required to make and use conventional multiple photomasks.

Figure 13:
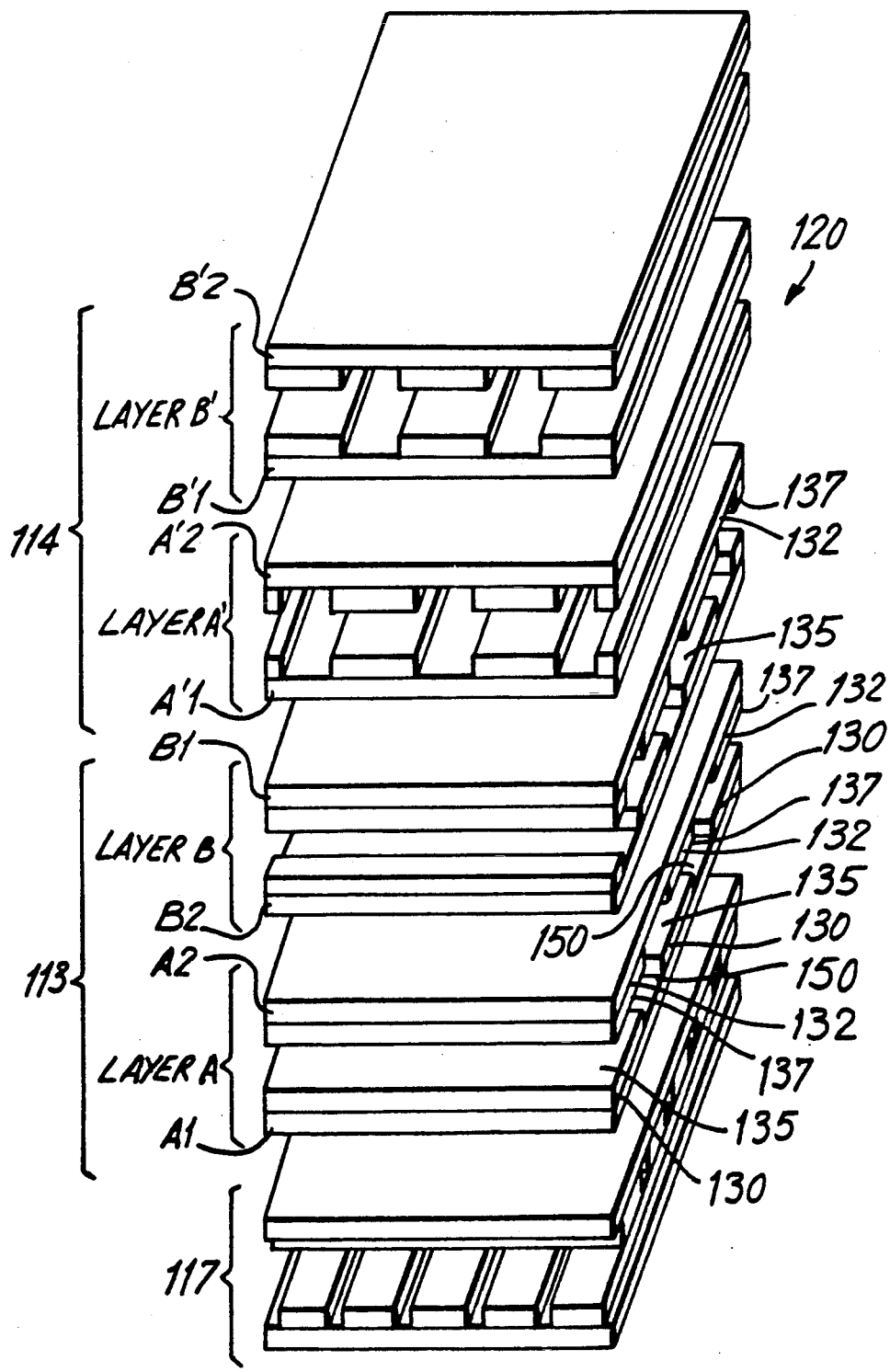
FIG. 13 depicts a preferred embodiment of a reconfigurable photomask having a laminated arrangement of layers of row and column bus bars.

Turning now to FIG. 13, a preferred embodiment of a reconfigurable photomask 120 in accordance with the present invention is depicted in exploded fashion. The reconfigurable photomask 120 is a laminated structure of a first pair 113 of layers A and B, a second pair 114 of layers A' and B' and a matrix assessable array 117. Each of these layers has a transparent pair of substrates (A1 and A2, B1 and B2, A'1 and A'2, B'1 and B'2) with opposing transparent longitudinal bus bar/electrodes on each substrate of each layer.

A first electrochromic material 135 is deposited in strips along each bus bar electrode 130 of substrate A1 of layer A of the first pair of layers. Preferably, a second electrochromic material 137 (not visible in FIG. 13) is deposited on the opposing bus bar electrodes 132 of the opposing substrate A2 of layer A. After deposition of the first and second electrochromic materials on the respective substrates of each layer, a thin layer 140 (not visible) of a polymeric solid electrolyte, preferably able to have its conductive regions photopatterned as described above with reference to FIGS. 1A, 5 and 9, is spread on either or both of the substrates of each layer and over the surfaces that carry the electrodes and the electrochromic materials. The substrates are then positioned together with the electrolyte layer sandwiched in between the mating substrates with the bus/bar electrodes on each of the mating substrates of each layer aligned so that the opposing bus bar/electrodes of the mating substrates of each layer align precisely along their entire length. Preferably, the whole assembly of each layer is then exposed to UV-light through a mask so that the longitudinal grooves 150 of the solid electrolyte adjacent to each pair of strips of the two electrochromic materials becomes ionically relatively non-conductive, throughout the height of each groove 150 in substantially the same manner described and illustrated with respect to FIG. 9 above. The rest of layers B, A' and B' are constructed in similar fashion.

Figure 14:
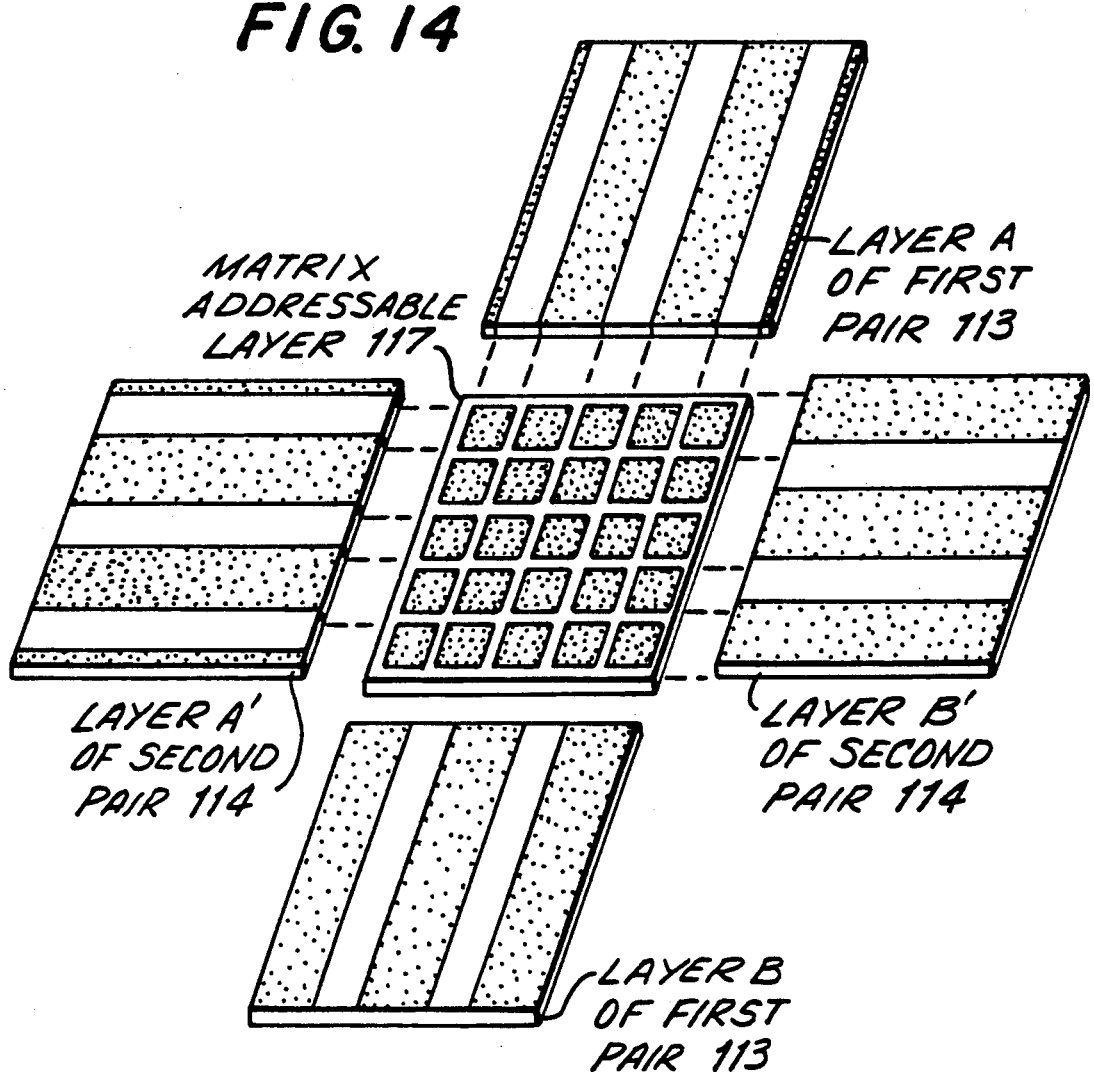
FIG. 14 depicts an exploded isometric view of the alignment details of each layer of a multiple layer photomask depicted in FIG. 13.

The assembled layers A, B, A' and B' are then brought together to form the completed laminated structure 120. Layer A of the first pair of layers 113 is aligned with layer B of the first pair with its bus bar/electrodes parallel to and alternating with (i.e. in between those of layer B). Preferably, layers A and B partially overlap when so assembled, as depicted in FIG. 14. Likewise, layer A' of the second pair of layers 114 is aligned with layer B' of the second pair with its bus bar/electrode pairs parallel to and alternating (and partially overlapping, preferably) with those of layer B'. The first pair of layers is then brought together with the second pair of layers with their respective bus bar/electrodes substantially perpendicular to one another. FIGS. 13 and 14 depict the preferred alignment details of each layer in relation to the others. It should be noted that the opposing bus bar/electrodes of each pair of layers are each independently row addressable by electrical biasing means, that is on a row-by-row basis.

Finally, the matrix addressable layer 117 is added. The matrix addressable array is of sandwich construction, preferably in accordance with the description above with respect to FIG. 9. As depicted in FIGS. 13 and 14, the matrix addressable layer is aligned with pixels alternatingly aligned with the spaces between the bus bar/electrodes of layers A, B, A' and B', respectively, to give complete control of the transparency or opacity of all areas of the laminated structure. Matrix addressable array 117 may also be omitted, if desired, without significant loss of control over the transparent and opaque areas of the completed laminated reconfigurable photomask.

The electrochromic materials chosen for the two opposing substrates of each layer are preferably complementary (i.e. the one gets reduced and colored upon the oxidation and change in color of the other). In this case, by careful selection of the two materials and an appropriate wavelength of the exposing light, the transparent areas of the assembly can be precisely controlled.

As an illustrative and non-limiting example, the first electrochromic material may be poly 3-methylthiophene (p3MeT), and the second may be a surface confined viologen. In their normal states, p3MeT is reduced and red and viologen is oxidized and colorless. Therefore, the whole assembly appears red and it is not transparent to blue light (400-470 nm). When a pair of electrodes of any layer is addressed electrically, that is when p3MeT is connected to the positive lead and viologen to the negative lead of a power supply, and sufficient voltage is applied across them (equal approximately to the difference in the formal redox potentials of the two substances), then p3MeT gets oxidized turning to blue, while viologen gets reduced turning to blue, according to reactions 3 and 4, above:

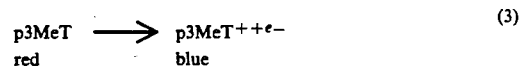

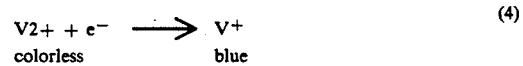

The result of this is that the common area of the two electrodes (defining a pixel) (a square shape for layer 117, a stripe shape for layers A, B, A', B') becomes transparent to the blue light, i.e., to wavelengths between 400-470 nm. When the assembly is held between a blue light source and a surface covered with a blue light sensitive photoresist, the areas of the photoresist are exposed by scanning the array of matrix addressable layer 117 in a line/at/a/time fashion as explained in detail above in connection with FIGS. 10, 11, 12 and at the same time synchronizing which stripe or stripes (i.e. pair or pairs of opposing bus bar/electrodes) of which layer (A, A', B, B') is/are blue.

Figure 15:
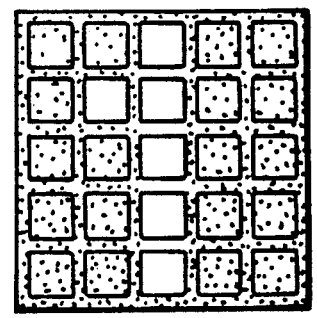
FIG. 15 depicts a desired mask pattern to be generated by means of the reconfigurable photomask constructed in accordance with a preferred embodiment of the present invention.
Figure 16:
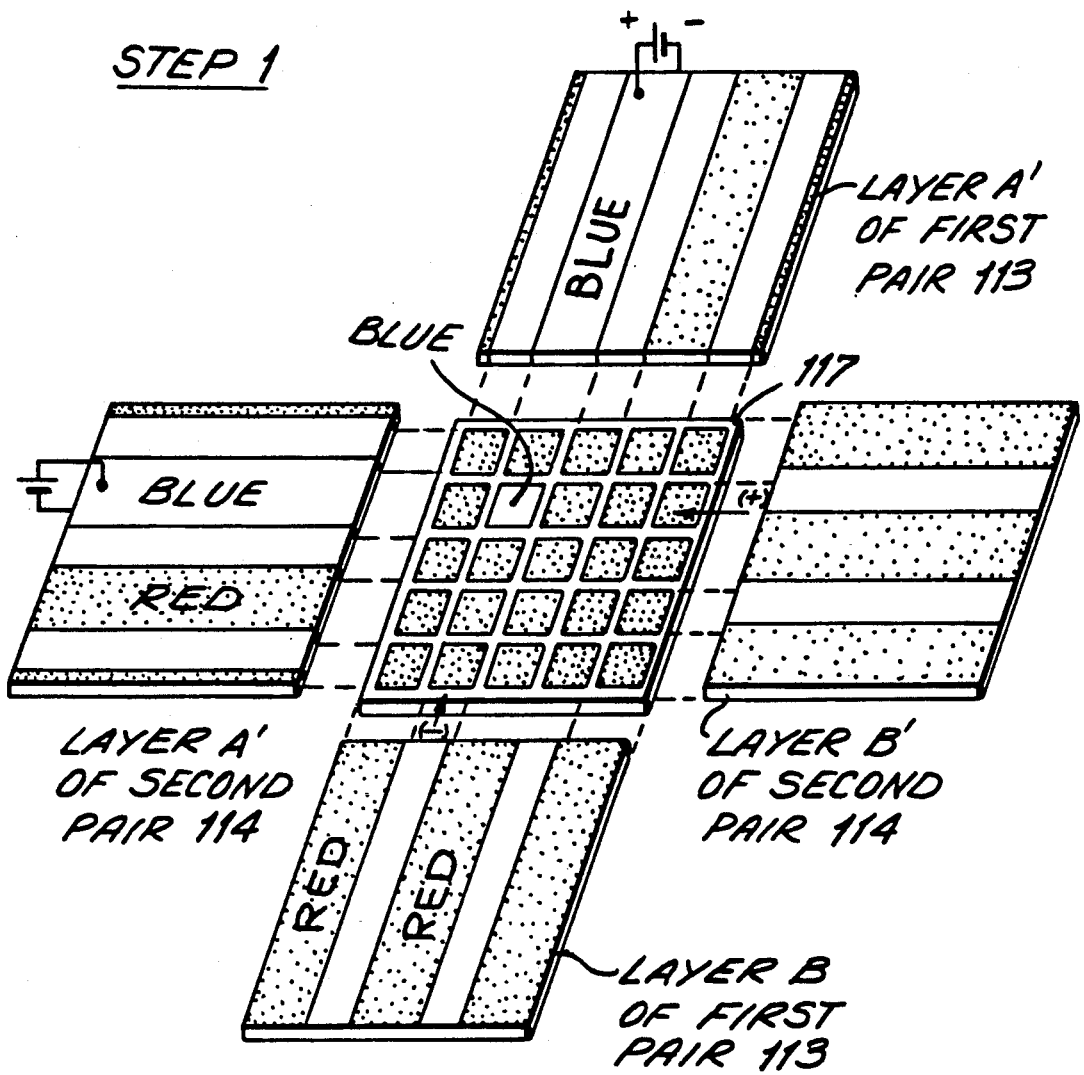
FIG. 16 depicts in exploded isometric view one of the operational steps of the reconfigurable photomask constructed in accordance with the present invention.
Figure 16A:
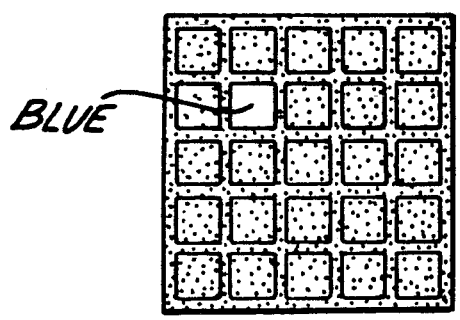
FIG. 16A depicts the mask pattern generated by the operational step depicted in FIG. 16.
Figure 17:
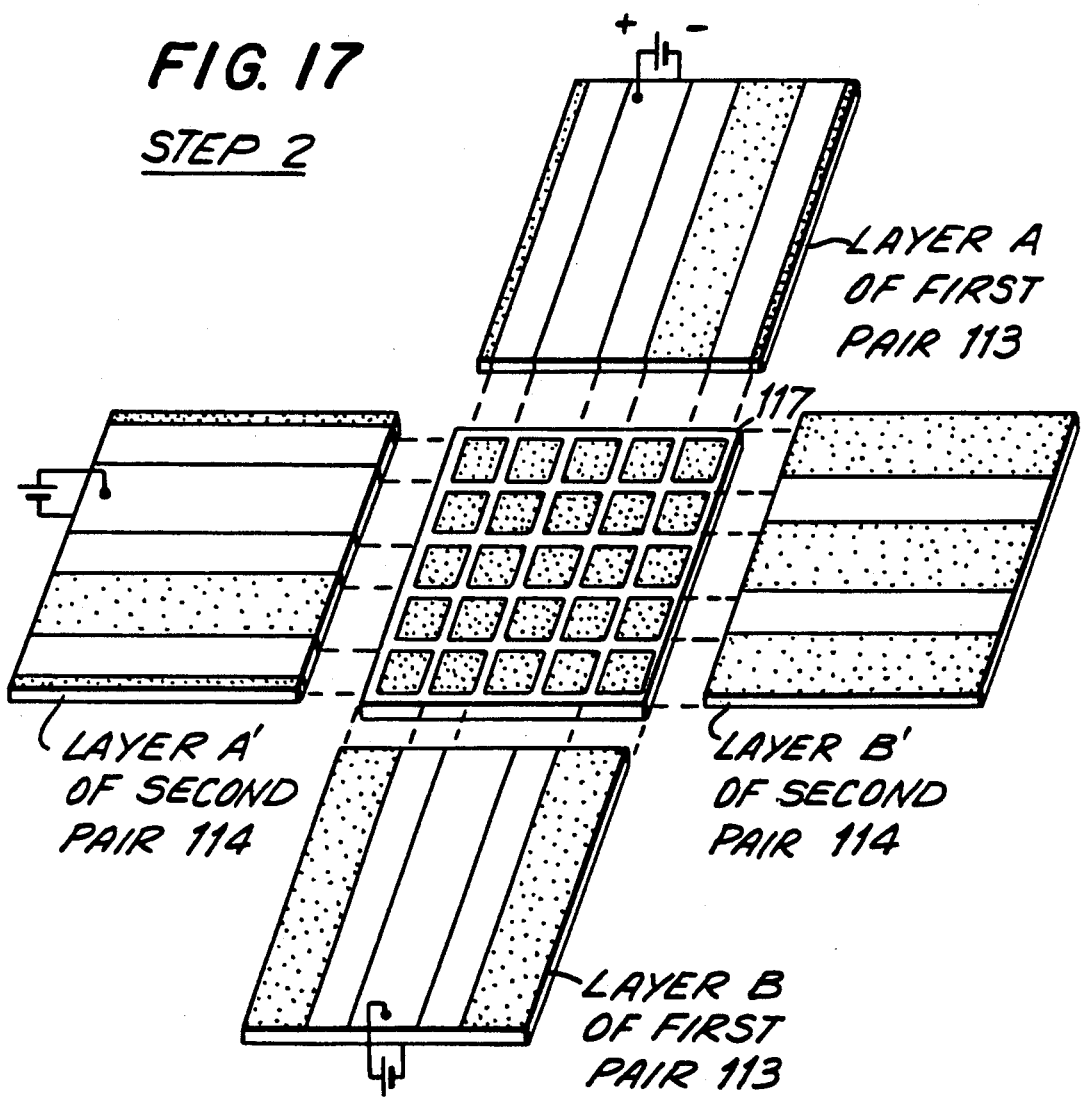
FIG. 17 depicts in exploded isometric view a second of the operational steps of the reconfigurable photomask constructed in accordance with the present invention.
Figure 17A:
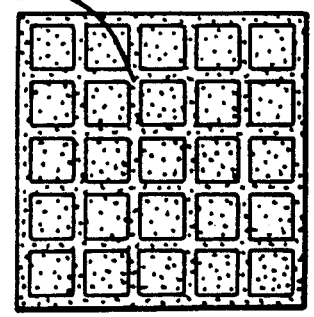
FIG. 17A depicts the mask pattern generated by the operational step depicted in FIG. 17.
Figure 18:
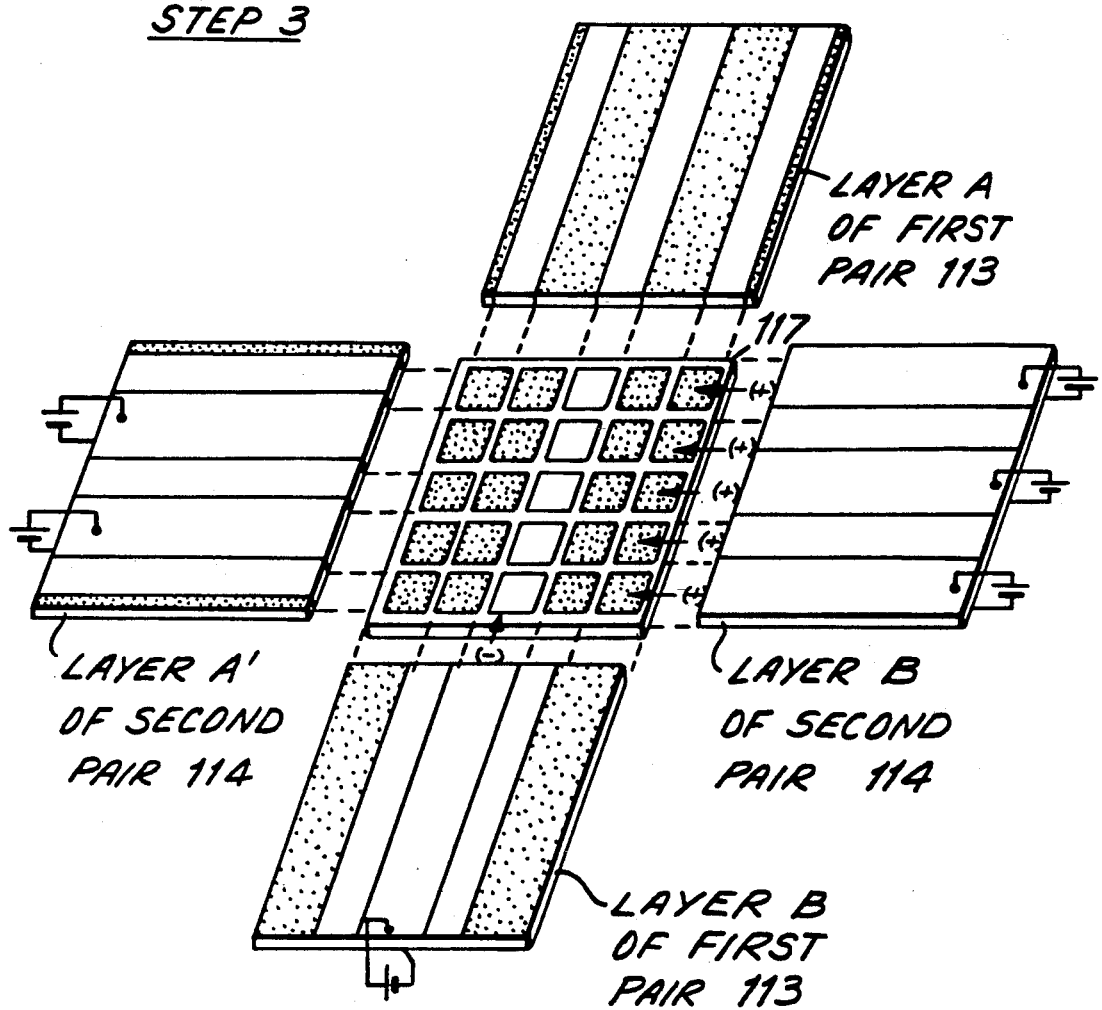
FIG. 18 depicts in exploded isometric view a third of the operational steps of the reconfigurable photomask constructed in accordance with the present invention.
Figure 18A:
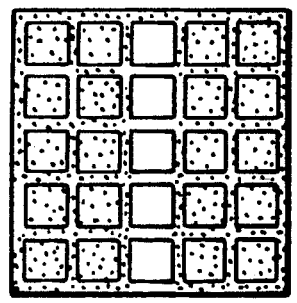
FIG. 18A depicts the mask pattern generated by the operational step depicted in FIG. 18.

Turning now to FIGS. 15, 16, 16A, 17, 17A, 18 and 18A, use of a reconfigurable photomask in accordance with the present invention will be described. FIG. 15 depicts a desired pattern to be transferred onto a blue sensitive photoresist as one photolithographic step of the manufacture of an integrated circuit. FIGS. 16-18A depict the sequence of steps in order to make the assembly transparent only on the areas where the underlying photoresist is to be exposed. In this example, the top electrodes of each layer are derivatized with p3MeT and the lower electrodes with viologen. Therefore giving a positive pulse to the bus bar/electrode of the top substrate synchronized with a negative pulse on the corresponding bus bar/electrode of the bottom substrate, p3MeT turns from red to blue and viologen from colorless to blue, corresponding to the light pixels and stripes of FIG. 16. Thus, the combination of the red and blue (in blue over red background) pixels with the red, blue or colorless stripes of FIG. 16 will yield the image (i.e. the area which will be exposed to blue light) depicted in FIG. 16A. Likewise, FIGS. 17 and 17A; and FIGS. 18 and 18A show other combinations of stripes and pixels and the image yielded. The images of FIGS. 16A, 17A and 18A are formed at different times. However, this will not adversely affect the exposure of the photoresist to the integrated circuit, since the total exposure pattern will be the sum of each of the individual images. Thus, the desired pattern of FIG. 15 is achieved, without "blank" spaces between any of the pixels. After subsequent manufacturing steps are applied to the integrated circuit, a different pattern can be formed on the reconfigurable photomask in the same manner. The pattern of FIG. 15 is thus shown in segments, and after it has been scanned once, may be scanned repetitively as long as desired to keep the underlying photoresist-covered surface exposed.

Figure 19:
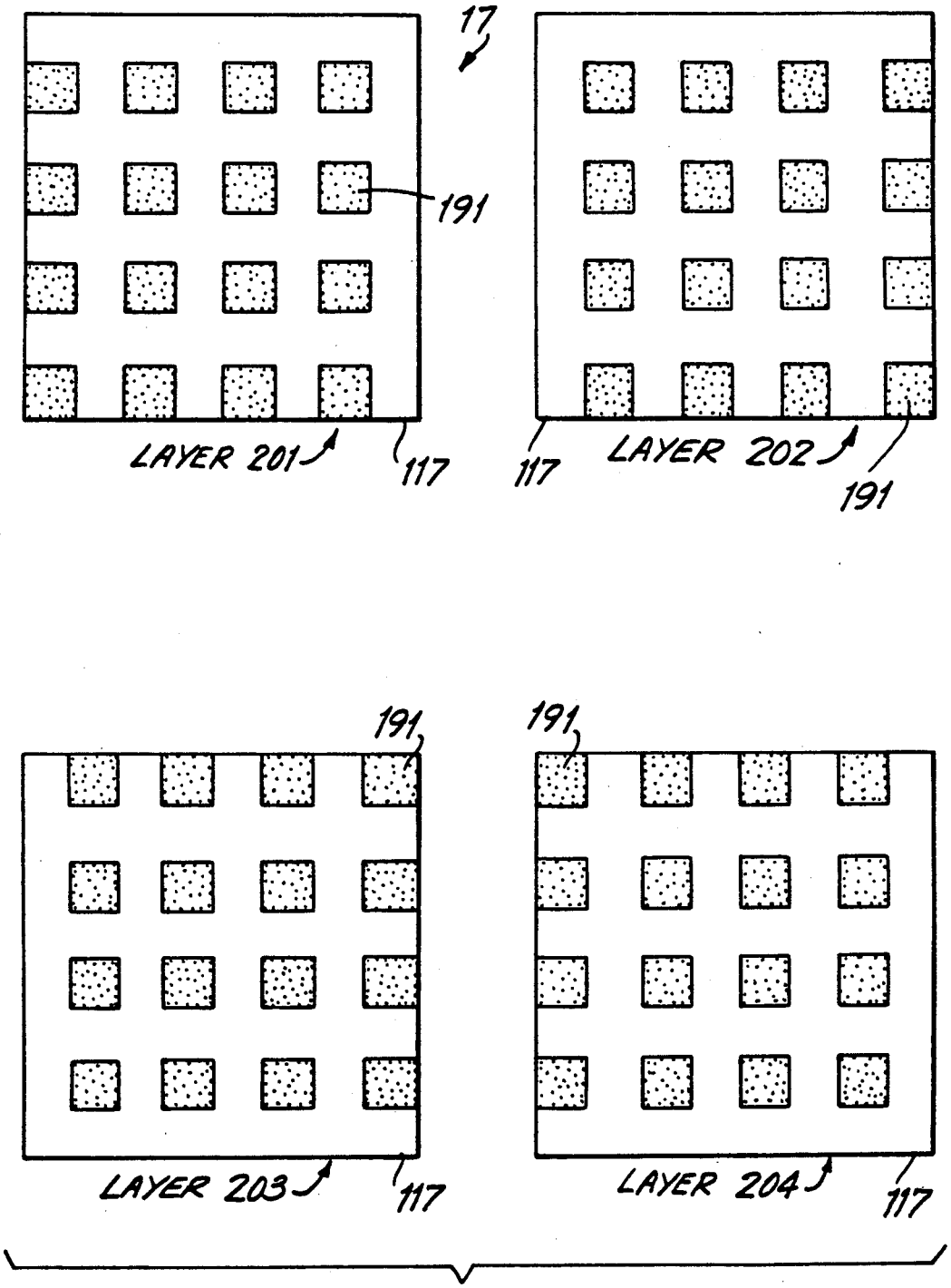
FIG. 19 depicts an exploded isometric view of the alignment details of each layer of an embodiment of a multiple layer photomask in accordance with the present invention having four laminated matrix addressable arrays.

FIG. 19 depicts an exploded view of the alignment details of another embodiment of a reconfigurable photomask 179 of the present invention. In this embodiment, four matrix addressable layers 201, 202, 203 and 204 are employed, each preferably constructed in accordance with the description above respecting FIG. 9. The width across each of the pixels 191 of each layer is approximately at least as wide across as the space between the pixels. Thus, when layer 201 is positioned together with layer 202 with its pixels of each row alternating with the pixels of layer 202, and layer 203 is positioned with layer 204 with its pixels of each row alternating with the pixels of layer 204, and then layers 201 and 202 and layers 203 and 204 positioned together with their rows of pixels alternating, control over the transparency or opacity of the entire area of the laminated photomask 179 will be obtained on a pixel-by-pixel basis. Although these layers are shown side by side for illustrative purposes, it is to be understood that in the completed assembly, these layers are laminated one on top of the other. With this construction, the complete pattern to be generated during one step of the photolithographic process can be generated on a line-/at/a/time basis, and the entire pattern maintained by periodic refreshing. However, precise alignment of the pixels of all layers is, of course, required to avoid "blank" space.

Another embodiment of the present invention is depicted in FIG. 20. In this embodiment, a transparent light modulating array I such as, for example, the electrochromic array depicted in cross-section in FIG. 6, is laminated on top of a light emitting display array II such as, for example, the electroluminescent array depicted in cross-section in FIG. 4 by means of laminating compound 200, which may be an epoxy, for instance. Of course, in this embodiment, the electrodes of array I must be transparent.

The construction and operation of this combined display is the same as the construction and operation of either array alone, except that overlying pixels of the two arrays are addressed simultaneously. This, if it is desired that a pixel be dark, the electrochromic pixel will be colored and the corresponding electroluminescent pixel below it will be left in its non-light emitting state. In FIG. 20, an electrochromic pixel on array I comprised of a pair of electrodes 36b and 62a derivatized with complementary electrochromic coverings 82 and 80, respectively, is depicted as uncolored. Simultaneously, the electroluminescent material 95 of the pixel in array II directly underneath the colored pixel of array I is left dark, while the electroluminescent material 95 of the pixel in array II directly underneath the uncolored pixel of array I is turned "on" so that it emits light. This configuration essentially multiplies the contrast from each layer, resulting in an overall display having higher contrast and sharper resolution than would be possible with either layer alone. In lieu of an electrochromic array for array I, a light modulating array utilizing liquid crystals as the light modulating material may also be employed.

The examples of the invention described above are not intended to be limiting either on materials or configurations. For example, liquid crystals could be employed with polarizing filters instead of electrochromics for use as a reconfigurable photomask, using the same configuration and alignment of electrodes. Furthermore, multi-layer laminated assemblies can also be constructed fully or partially offset from each other and with electrochromics having different color change states, for an application where the final assembly is going to be used as a reconfigurable projection slide. The FIG. 19 embodiment is particularly adaptable for use as such a reconfigurable projection slide.

The terms which have been employed herein are terms of expression and not of limitation and there is no intention in the use of such terms of limiting the invention to only the preferred embodiments shown and described.

What is claimed is:

1. An electrochromic display pixel comprising a substrate, a pair of electrodes mounted face up and side by side on one side of said substrate and in close proximity to each other, at least one of said electrodes being coated on its face with a first chemical substance which is electrochromic, a layer of ionically conductive electrolyte over said electrode pair to complete an electrochemical cell so that when a bias is imposed between the electrodes of said pair, said first chemical substance changes its spectral absorption characteristics, a relatively non-conductive border region surrounding said pixel, and a transparent cover having a substantially non-conductive face in contact with said electrolyte layer.

2. The display pixel defined in claim 1, wherein said first chemical substance material is confined on one of said electrodes and the other electrode of said pair is coated with a second chemical substance which is electrochemically complementary to said first chemical substance.

3. The display pixel defined in claim 2, wherein said second chemical substance is electrochromically complementary to said first chemical substance.

4. The display pixel defined in claim 3, wherein said first chemical substance is tungsten trioxide and said second chemical substance is polyaniline.

5. The display pixel defined in claim 3, wherein said first chemical substance is tungsten trioxide and said second chemical substance is a poly 3-methythiophene.

6. The display pixel defined in claim 3, wherein said first chemical substance is viologen and said second chemical substance is polyvinylferrocene.

7. The display pixel defined in claim 3, wherein said first chemical substance is tungsten trioxide and said second chemical substance is anodically grown iridium oxide.

8. The display pixel defined in claim 1, wherein said electrolyte is a solid electrolyte.

9. The display pixel defined in claim 8, wherein said solid electrolyte is a polymer.

10. The display pixel defined in claim 1, wherein said electrodes of said pair interdigitate with each other.

11. The display pixel defined in claim 1, wherein said pixel is less than about 200 microns across.

12. The display pixel defined in claim 1, wherein at least one of said electrodes is at least partially embedded into the one side of said substrate.

13. The display pixel as defined in claim 1, wherein at least one of said electrodes is transparent.

14. The display pixel defined in claim 1, wherein said border region around said pixel is comprised of said electrolyte layer rendered relatively non-conductive in place by selective exposure of said border region to electromagnetic radiation.

15. The display pixel defined in claim 14, wherein said relatively non-conductive border region surrounding said pixel includes a polymer formed by subjecting a monomer or oligomer mixed in the electrolyte to electromagnetic radiation to reduce the mobility of charge carriers in the border region of said electrolyte.

16. The display pixel defined in claim 14, wherein said relatively non-conductive border region surrounding said pixel includes a polymer formed by exposing a monomer or oligomer previously mixed in the electrolyte to electromagnetic radiation to induce cross-linking of said monomer or oligomer with said electrolyte of said border region to reduce the mobility of charge carriers in the border region of said electrolyte.

17. The display pixel defined in claim 1, wherein said electrolyte includes a metal complex that can photorelease a substance that reduces the mobility of the current supporting ions upon exposure to UV-light.

18. The display pixel defined in claim 1, wherein said electrolyte includes a substance which can release a base upon exposure to UV-light to neutralize the protons that are responsible for charge transport in the electrolyte.

19. A display comprising an array of matrix addressable pairs of electrodes, said array comprising:
(a) a substrate;
(b) a plurality of substantially parallel and spaced apart electronically conductive means defining columns of bus bars mounted on one side of said substrate, each of said column bus bars being electrically separate from the other column bus bars so that each is independently addressable by electrical biasing means;
(c) a plurality of column electrode means mounted face up on said one side of said substrate and spaced at intervals along each of said column bus bars;
(d) a plurality of substantially parallel and spaced apart electronically conductive means defining row bus bars on said one side of said substrate, said row bus bars crossing but being electrically insulated from said column bus bars, each of said row bus bars being electrically separate from the other row bus bars so that each of said row bus bars is independently addressable by electrical biasing means;
(e) a plurality of row electrode means mounted face up on said one side of said substrate and spaced at intervals along each row bus bar, each of said row electrodes being positioned to have a column electrode in close proximity to and side by side therewith to define an electrode pair; and
(f) a transparent cover having a substantially non-conductive face in contact with said electrolyte layer.

20. The display defined in claim 19, wherein the row electrode of each pair interdigitates with its associated column electrode.

21. The display defined in claim 19, wherein each said electrode pair is less than about 200 microns across.

22. The display defined in claim 19, further including a coating of a first chemical substance which is electrochromic on the face at least one of said electrodes of each of said pairs and a layer of ionically conductive electrolyte over said pairs of electrodes.

23. The display defined in claim 22, wherein said electrochromic first chemical substance is confined on the face of one of the electrodes of each pair and the other electrode of said pair is coated on its face with a second chemical substance which is electrochemically complementary to said first chemical substance.

24. The display defined in claim 23, wherein said second chemical substance is further electrochromically complementary to said first chemical substance.

25. The display defined in claim 24, wherein said electrochromic first chemical substance is tungsten trioxide and said electrochromic second chemical substance is polyaniline.

26. The display defined in claim 24, wherein said electrochromic first chemical substance is tungsten trioxide and said electrochromic second chemical substance is poly 3-methythiophene.

27. The display defined in claim 24, wherein said electrochromic first chemical substance is viologen and said electrochromic second chemical substance is polyvinylferrocene.

28. The display defined in claim 24, wherein said electrochromic first chemical substance is tungsten trioxide and said electrochromic second chemical substance is anodically grown iridium oxide.

29. The display defined in claim 22, wherein said electrolyte is substantially solid.

30. The display as defined in claim 29, wherein said solid electrolyte is a polymer.

31. The display defined in claim 22, wherein said layer of electrolyte is separated into individual zones over each of said pairs by relatively non-conducting borders so that each electrode pair constitutes a substantially separate electrochemical cell.

32. The display defined in claim 22, wherein said relatively non-conductive borders around each of said pairs are comprised of said electrolyte layer rendered relatively non-conductive in place by selective exposure of said electrolyte layer in the region of said border to electromagnetic radiation.

33. The display defined in claim 32, wherein said relatively non-conductive borders surrounding each of said pairs includes a polymer formed by subjecting a monomer or oligomer previously mixed in the electrolyte to electromagnetic radiation to reduce the mobility of charge carriers in the border region of said electrolyte.

34. The display defined in claim 32, wherein said relatively non-conductive borders include a polymer formed by subjecting a monomer or oligomer to electromagnetic radiation to induce cross-linking of said monomer or oligomer with said electrolyte to reduce the mobility of charge carriers in the border region of said electrolyte.

35. The display defined in claim 22, wherein said electrolyte includes a metal complex that can photorelease a substance that reduces the mobility of the current supporting ions upon exposure to UV-light.

36. The display defined in claim 32, wherein said electrolyte includes a substance which can release a base upon exposure to UV-light to neutralize the protons that are responsible for charge transport in the electrolyte.

37. The display as defined in claim 19, wherein at least some of said column bus bars are at least partially embedded into the one side of said substrate.

38. The display as defined in claim 19, wherein at least some of said electrode means are at least partially embedded into the one side of said substrate.

39. The display as defined in claim 19, wherein at least some of said electrode means are transparent.

40. A display pixel comprising a pair of first and second electrodes having faces in opposed and spaced apart relationship to each other, said first electrode including on its opposed face a coating of a first chemical substance which is electrochromic, said second electrode including on its opposed face a coating of a second chemical substance electrochemically complementary to said first chemical substance, a layer of electrolyte sandwiched between said coated first and second electrodes so that when a bias is imposed between said electrodes, said electrochromic first chemical substance changes its spectral absorption characteristics and a relatively non-conductive border region surrounding said pixel, said electrolyte including a metal complex that can photorelease a substance that reduces the mobility of the current supporting ions upon exposure to UV-light and said border region around said pixel being comprised of said electrolyte layer rendered relatively non-conductive in place by photorelease of said substance caused by selective exposure of said border region to UV-light.

41. A display pixel comprising a first electrode and a second electrode in opposed and spaced apart relationship to each other, said first electrode including on its opposed face a coating of a first chemical substance which is electrochromic, a layer of electrolyte covering and electrolytically connecting said coated first and second electrodes, said electrolyte including a substance that can release a base upon exposure to UV-light to neutralize the protons that are responsible for charge transport in the electrolyte thereby rendering the exposed electrolyte relatively non-conductive, said electrolyte layer including a border region surrounding said pixel rendered relatively non-conductive by release of said base and having a central region substantially free of said released base.

42. The display pixel as defined in claim 40, wherein said electrochromic first substance is tungsten trioxide and said electrochromic second substance is polyaniline.

43. The display pixel as defined in claim 40, wherein said electrochromic first substance is tungsten trioxide and said electrochromic second substance is poly 3-methylthiophene.

44. The display pixel as defined in claim 40, wherein said electrochromic first substance is viologen and said electrochromic second substance is polyvinylferrocene.

45. The display pixel as defined in claim 40, wherein said electrochromic first substance is tungsten trioxide and said electrochromic second substance is anodically grown iridium oxide.

46. The display pixel defined in claim 40, wherein said electrolyte is substantially solid.

47. The display pixel defined in claim 46, wherein said solid electrolyte is a polymer.

48. The display pixel defined in claim 40, wherein said pixel is less than about 200 microns across.

49. A display comprising an array of matrix addressable pixels, said display comprising:
(a) a first substrate;
(b) a plurality of substantially parallel and spaced apart means defining columns of bus bars mounted on said first substrate, each of said column bus bars being independently addressable by electrical biasing means and having a plurality of column electrode means face up and at spaced intervals along the length of said column;
(c) a second substrate in opposed and facing relationship to said first substrate but spaced apart therefrom,
(d) a plurality of substantially parallel and spaced apart means defining rows of bus bars mounted face up on said second substrate, each of said row bus bars being independently addressable by electrical biasing means and having a plurality of row electrode means at spaced intervals along its length so that each row electrode is in opposed and facing relationship to a corresponding column electrode means but spaced apart therefrom to define an electrode pair;
(e) a coating of a first electrochromic material on the face of each of said column electrode means and a coating of a material electrochemically complementary to said first electrochromic material on each of said row electrode means;
(f) a layer of electrolyte sandwiched between each said first and second electrodes, said electrolyte including a metal complex that can photorelease a substance that reduces the mobility of the current supporting ions upon exposure to UV-light, said layer of electrolyte being separated into individual zones by relatively non-conducting borders comprised of said electrolyte rendered relatively non-conducting by photorelease of said substance caused by selective exposure to UV light so that each electrode pair constitutes a substantially separate electrochemical cell defining a pixel.

50. The display as defined in claim 49, wherein said first electrochromic material is tungsten trioxide and said second electrochromic material is polyaniline.

51. The display as defined in claim 49, wherein said first electrochromic material is tungsten trioxide and said second electrochromic material is poly 3-methylthiophene.

52. The display as defined in claim 49, wherein said first electrochromic material is viologen and said second electrochromic material is polyvinylferrocene.

53. The display as defined in claim 49, wherein said first electrochromic material is tungsten trioxide and said second electrochromic material is anodically grown iridium oxide.

54. The display defined in claim 49, wherein said electrolyte is substantially solid.

55. The display defined in claim 54, wherein said solid electrolyte is a polymer.

56. The display defined in claim 49, wherein each of said pairs is less than about 200 microns across.

57. A multilayer laminated display comprising at least first and second matrix addressable arrays of pixels, each of said arrays comprising:
(a) a substrate;
(b) a plurality of substantially parallel and spaced apart electronically conductive means defining columns of bus bars mounted on one side of said substrate, each of said column bus bars being electrically separate from the other column bus bars so that each is independently addressable by electrical biasing means;
(c) a plurality of column electrode means mounted face up on said one side of said substrate and spaced at intervals along each of said column bus bars;

(d) a plurality of substantially parallel and spaced apart electronically conductive means defining row bus bars on said one side of said substrate, said row bus bars crossing but being electrically insulated from said column bus bars, each of said row bus bars being electrically separate from the other row bus bars so that each of said row bus bars is independently addressable by electrical biasing means;

(e) a plurality of row electrode means mounted face up on said one side of said substrate and spaced at intervals along each row bus bar, each of said row electrodes being positioned to have a column electrode in close proximity thereto and side by side therewith to define an electrode pair, at least one of said electrodes of each said pair being coated on its face with a first electrochromic material; and (f) a layer of ionically conductive electrolyte over said pairs of electrodes, to complete an electrochemical cell, said layer of electrolyte being separated by relatively non-conductive border regions into a plurality of zones, each of said zones being associated with one of said pair of electrodes.

58. A multilayer laminated display comprising first and second matrix addressable arrays of pixels, each of said arrays comprising:

(a) a first substrate;

(b) a plurality of substantially parallel and spaced apart electronically conductive means defining columns of bus bars mounted on said first substrate, each of said column bus bars being independently addressable by electrical biasing means and having a plurality of transparent column electrode means mounted face up and at spaced intervals along the length of said column, each of said column electrode means being coated on its face with a first electrochromic material;

(c) a second substrate in opposed and facing relationship to said first substrate but spaced apart therefrom, (d) a plurality of substantially parallel and spaced apart electronically conductive means defining rows of bus bars mounted face up on said second substrate, each of said row bus bars being independently addressable by electrical biasing means and having a plurality of transparent row electrode means mounted face up and at spaced intervals along the length of said row so that each row electrode is in opposed and facing relationship to a corresponding column electrode means but spaced apart therefrom to define a display pixel, each of said row electrode means being coated on its face with a material electrochemically complementary to said first electrochromic material;

(e) a layer of electrolyte sandwiched between said coated first and second electrodes and a relatively non-conductive border separating said layer of electrolyte into substantially separate zones, each of zones being associated with one of said pixels.

59. The multilayer laminated display defined in claim 58, wherein said electrochemically complementary material is a second electrochromic material electrochromically complementary to said first electrochromic material.

60. The multilayer laminated display defined in claim 58, wherein the pixels of respective ones of said arrays are fully offset from one another.

61. The multilayer laminated display defined in claim 58, wherein the pixels of respective ones of said arrays are partially offset from one another.

62. The multilayer laminated display defined in claim 59, wherein said first electrochromic material of said first array is electrically changable between color states and said first electrochromic material of said second array is changable between color states different from the color states of said first electrochromic material of said first array.

63. The multilayer laminated display defined in claim 58, wherein there are at least three layers of said arrays.

* * * * *